United States Patent
Ramos et al.

(10) Patent No.: US 11,874,816 B2
(45) Date of Patent: Jan. 16, 2024

(54) LOCK FREE DISTRIBUTED TRANSACTION COORDINATOR FOR IN-MEMORY DATABASE PARTICIPANTS

(71) Applicant: Microsoft Technology Licensing, LLC, Redmond, WA (US)

(72) Inventors: Rogerio Ramos, Redmond, WA (US); Youssef M. Barakat, Redmond, WA (US); Shirish Gajera, Sunnyvale, CA (US); Karthick Krishnamoorthy, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 215 days.

(21) Appl. No.: 16/168,637

(22) Filed: Oct. 23, 2018

(65) Prior Publication Data

US 2020/0125654 A1    Apr. 23, 2020

(51) Int. Cl.
  *G06F 16/23* (2019.01)
  *G06F 16/27* (2019.01)

(52) U.S. Cl.
  CPC ...... *G06F 16/2315* (2019.01); *G06F 16/2358* (2019.01); *G06F 16/2379* (2019.01); *G06F 16/27* (2019.01)

(58) Field of Classification Search
  CPC .............................. G06F 16/27; G06F 16/2315
  See application file for complete search history.

(56) References Cited

U.S. PATENT DOCUMENTS 7,206,805 B1    4/2007 McLaughlin, Jr.
8,812,555 B2 *  8/2014 Larson ................ G06F 16/9014
                                                    707/800

(Continued)

FOREIGN PATENT DOCUMENTS

EP    3026574 A1    6/2016
WO   2011018646 A1  2/2011

OTHER PUBLICATIONS

Application as Filed in U.S. Appl. No. 16/018,553, filed Jun. 26, 2018, 102 Pages.

(Continued)

*Primary Examiner* — Mark D Featherstone
*Assistant Examiner* — Tony Wu
(74) *Attorney, Agent, or Firm* — Weaver IP L.L.C.

(57) ABSTRACT

Methods, systems, apparatuses, and computer program products are provided for coordinating a distributed database transaction. A transaction driver, such as a client machine, may initiate a distributed transaction. The transaction driver may transmit to a transaction coordinator a driver report that includes identifying information related to the distributed transaction, including an identification of participants involved in the transaction. The coordinator may determine whether participant reports, which include a status of the portion of the distributed database transaction of a particular participant, are received from each of the participants. Participant reports may also identify participants that are descendants of the reporting participant. The transaction coordinator may store, in a table, information to track the progress of the distributed transaction. Using the table, an outcome of the distributed transaction may be determined and transmitted to one or more of the involved participants.

20 Claims, 7 Drawing Sheets

(56) References Cited

U.S. PATENT DOCUMENTS

| | | | |
|---|---|---|---|
| 8,838,534 B2 | 9/2014 | Fowler | |
| 9,075,841 B2 | 7/2015 | Larson et al. | |
| 9,305,047 B2 | 4/2016 | Little | |
| 2004/0030703 A1* | 2/2004 | Bourbonnais | G06F 16/2379 |
| 2007/0168351 A1* | 7/2007 | Fachan | G06F 16/1865 |
| 2009/0217274 A1* | 8/2009 | Corbin | G06F 9/466 |
| | | | 718/101 |
| 2009/0292744 A1* | 11/2009 | Matsumura | G06F 16/27 |
| 2011/0041006 A1* | 2/2011 | Fowler | G06F 9/5072 |
| | | | 714/10 |
| 2011/0246822 A1* | 10/2011 | Little | G06F 16/2308 |
| | | | 714/16 |
| 2013/0103659 A1* | 4/2013 | Larson | G06F 16/2365 |
| | | | 707/703 |
| 2014/0149484 A1* | 5/2014 | Mitchell | G06F 16/2365 |
| | | | 709/201 |
| 2015/0120645 A1 | 4/2015 | Varakur | |
| 2016/0147813 A1 | 5/2016 | Lee et al. | |
| 2016/0232178 A1* | 8/2016 | Little | G06F 9/466 |
| 2017/0097847 A1* | 4/2017 | Convery | G06F 16/2379 |

OTHER PUBLICATIONS

"Technical Standard Distributed Transaction Processing: The XA Specification", Retrieved from https://pubs.opengroup.org/onlinepubs/009680699/toc.pdf, Dec. 31, 1991, 94 Pages.

"International Search Report and Written Opinion Issued in PCT Application No. PCT/US2019/052534", dated Nov. 20, 2019, 13 Pages.

"Office Action Issued in Indian Patent Application No. 202147018689", dated Dec. 28, 2022, 9 Pages.

\* cited by examiner

LOCK FREE DISTRIBUTED TRANSACTION COORDINATOR FOR IN-MEMORY DATABASE PARTICIPANTS

BACKGROUND

Database transactions can span many forms and involve a variety of different databases. For instance, a local transaction on a database may include an operation that may be carried out in a single database. In some other instances, a transaction may be carried out across a plurality of databases, also known as a distributed transaction. In a distributed transaction, each database involved in the transaction may maintain its own transaction log recording database events that is independent of other database transaction logs. For example, where several independent databases are part of a larger cloud-based system, each database involved in a distributed transaction may respectively carry out a particular portion of the distributed transaction and separately log each event in a transaction log.

However, in some distributed transactions, a dependence may exist between multiple databases involved in the transaction such that operations across all of the involved databases may need to be carried out atomically. For instance, a particular transaction may require that multiple databases carry out portions of a desired task. Where one or more databases go offline, reboot, crash or otherwise fail to execute a particular portion of a distributed transaction, one database may fail to carry out its portion of the transaction, while other databases successfully execute their operations. As a result, consistency problems may result, such as different parts of the same transaction unnecessarily being left in a pending or an aborted state, database corruption, data mismatches, etc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for coordinating a distributed database transaction. A transaction driver, such as a client machine, may initiate a distributed transaction. The transaction driver may transmit to a transaction coordinator a driver report that includes a global identifier of the distributed database transaction, a transaction driver identifier, and participant identifiers that indicate the participants responsible for portions of the distributed database transaction. The coordinator may determine whether participant reports, which include a status of the portion of the distributed database transaction of a particular participant, among other things, are received from each of the participants. In some cases, a received participant report may identify one or more descendant participant identifiers that are descendants of the reporting participant. The transaction coordinator may store, in a table, the global identifier, participant identifiers, any descendant participant identifiers, and for each of the participants that transmitted a participant report, a status of the portion of the distributed database transaction of the reporting entity. Using the table, an outcome of the distributed transaction may be determined and transmitted to one or more of the involved participants.

In the above manner, the transaction coordinator is enabled to track the status and/or progress of a distributed transaction involving a number of participants. For instance, if any one of the participants aborts its respective portion of the distributed transaction, the coordinator may determine that the transaction is to be aborted for all of the involved participants, causing the transaction to be recorded in a durable table of the coordinator as an aborted transaction. Likewise, if each of the reporting participants commit to a distributed transaction, the transaction coordinator may determine that the distributed transaction is fully committed by all involved participants, thereby committing the transaction in its entirety and enabling the transaction to be stored in the durable table of the coordinator and/or hardened in each participant's transaction logs. In this way, the transaction coordinator may ensure that transactions are executed (or not executed) atomically in an appropriate manner.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
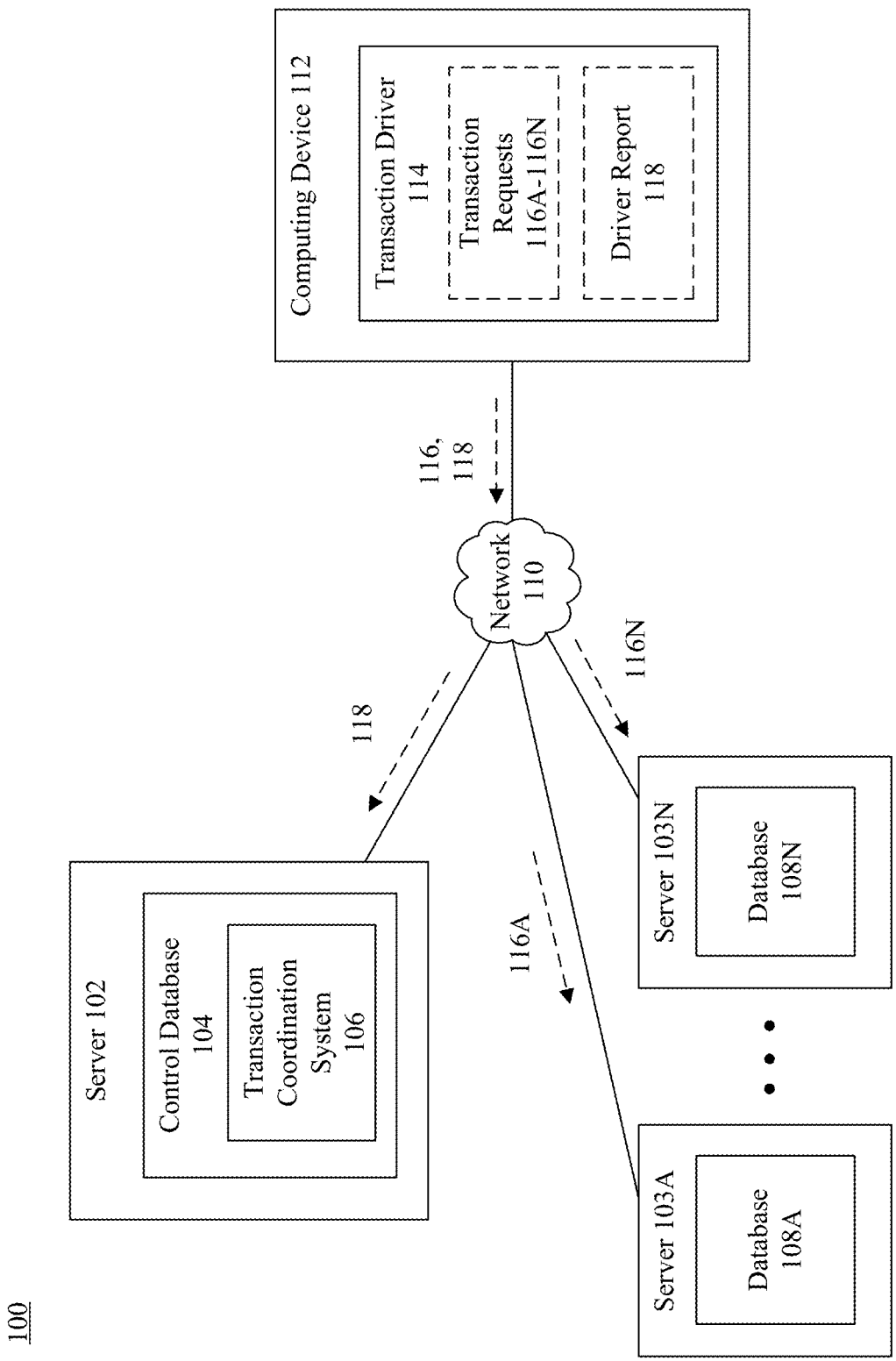
FIG. 1 shows a block diagram of a distributed transaction coordination system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Database transactions can span many forms and involve a variety of different databases. For instance, a local transaction on a database may include an operation that may be carried out in a single database. In some other instances, a transaction may be carried out across a plurality of databases, also known as a distributed transaction. In a distributed transaction, each database involved in the transaction may maintain its own transaction log recording database events that is independent from other database transaction logs. For example, where several independent databases are part of a larger cloud-based system, each database involved in a distributed transaction may respectively carry out a particular portion of the distributed transaction and separately log each event in a transaction log, which may include a file or files in a database that records transactions and database modifications made by each transaction.

However, in some distributed transactions, a dependence may exist between multiple databases involved in the transaction such that operations across all of the involved databases may need to be carried out atomically. For instance, a particular transaction may require that multiple databases carry out portions of a desired task. Where one or more databases go offline, reboot, crash or otherwise fail to execute a particular portion of a distributed transaction, one database may fail to carry out its portion of the transaction, while other databases successfully execute their operations. As a result, consistency problems may result, such as different parts of the same transaction unnecessarily being left in a pending or an aborted state, database corruption, data mismatches, etc.

Embodiments described herein address these and other issues by providing a transaction coordinator that is configured to coordinate a distributed transaction initiated by a transaction driver. The transaction driver may transmit a report including a global identifier of the transaction, a transaction driver identifier, and participant identifiers identifying each of the transaction driver's descendants that are involved in the distributed transaction. For instance, the transaction driver may identify each participant that is responsible for separate portions of the distributed transaction. The transaction driver may also be configured to transmit a request to each of the participants indicating each participant's respective role in the distributed transaction before, after, or at the same time as transmitting the report to the coordinator. The transaction coordinator may receive reports from one or more of the participants identifying, among other things, the status of a portion of the distributed transaction of the participant. The status may include, for instance, an indication that the participant has committed to the transaction or aborted the transaction. The coordinator may track the progress of the transaction by storing information for each of the received reports in a lock-free data structure, including but not limited to a hash table or the like. Using the table, the transaction coordinator may determine an outcome of the distributed transaction as a whole, such as whether the transaction is fully committed or should be aborted by all involved participants.

Coordinating a distributed transaction in such a way has numerous advantages. For example, the transaction coordinator may be configured to receive reports from the transaction driver and any identified participants in any order. For instance, if a participant identifies itself as an entity involved in a particular distributed transaction before the coordinator receives a report from the transaction driver identifying the distributed transaction, the coordinator may be configured to dynamically construct a structure in a table that contains a global identifier of the transaction and the identity of the reporting participant while it awaits reports from other involved entities (e.g., the transaction driver, other participants, etc.). As a result, the transaction coordinator may be enabled to initiate tracking a status of a distributed transaction irrespective of the order in which the coordinator receives reports, thereby enabling the coordinator to manage such transactions more efficiently. In this manner, database systems comprising such a transaction coordinator may be enabled to better manage distributed transactions and allow for ensuring that transactions are carried out in an atomic fashion.

Furthermore, database systems comprising a transaction coordinator described herein may be enabled to manage distributed transactions in a non-centralized manner. For example, if the transaction coordinator crashes or reboots during execution of a distributed transaction (which may result in the transaction coordinator losing a dynamically generated table identifying information relating to the transaction), the pending transaction information may nevertheless be reconstructed. For instance, the transaction driver and/or any participants involved in the transaction may automatically re-transmit reports to the transaction driver upon a network error or a timeout error (e.g., such as where the driver or participant fail to receive a response from the coordinator), thereby enabling the coordinator to re-generate the table for the distributed transaction. Similarly, if any particular participant crashes, the participant may determine whether any distributed transactions in the participant's transaction log are currently in a pending state. For each such transaction, the participant may re-transmit a report to the transaction coordinator identifying the transaction or transmit a request for the status of the transaction. As a result, distributed transactions may be coordinated in a non-centralized way with an automatic healing capability in the event of one or more system failures, thereby further improving database systems.

Example implementations are described as follows that are directed to techniques for coordinating a distributed database transaction. For instance, FIG. 1 shows a block diagram of an example distributed transaction coordination system 100, according to an example embodiment. As shown in FIG. 1, system 100 includes a server 102, servers 103A-103N, and a computing device 112, which are communicatively coupled by a network 110. Server 102 includes a control database 104. Servers 103A-103N include databases 108A-108N, respectively. Computing device 112 includes a transaction driver 114. Control database 104 includes a transaction coordination system 106. Transaction coordination system 106 is configured to control and/or manage distributed database transactions. In implementations, such distributed database transactions may include transactions involving one or more of control database 104 and/or databases 108A-108N. System 100 is further described as follows.

Network 110 may include one or more of a local area network (LAN), a wide area network (WAN), a personal area network (PAN), and/or a combination of communication networks, such as the Internet. Computing device 112 is communicatively connected to server 102 and servers 103A-103N via network 110 In an implementation, computing device 112, server 102, and servers 103A-103N may communicate via one or more application programming interfaces (API), and/or according to other interfaces and/or techniques. In some other implementations, computing device 112, server 102, and servers 103A-103N (and subcomponents thereof) may communicate via one or more network calls (e.g., remote procedure calls) JavaScript Object Notation (JSON) over HyperText Transfer Protocol (HTTP) requests, reports, etc.

Server 102. servers 103A-103N, and computing device 112 may each include at least one network interface that enables communications with each other over network 110. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Computing device 112 may comprise any device configured to generate database transactions and/or queries to one or more databases. Computing device 112 may comprise a desktop computer, a portable computer, a smartphone, a tablet, a wearable computing device, a mixed and/or virtual reality device (e.g., Microsoft HoloLens™), or any other processing device for generating database transactions and/or queries. In some example implementations, computing device 112 may comprise one or more computer programs, software, interfaces, or the like, for accessing remote databases, such as control database 104 and databases 108A-108N. It is noted that although such databases are illustrated in FIG. 1 as being remotely located from computing device 112, implementations are not so limited. For instance, computing device 112, server 102, and/or one or more of servers 103A-103N may be co-located, may be implemented on a single computing device, or may be implemented on or distributed across one or more additional computing devices not expressly illustrated in FIG. 1. Furthermore, although FIG. 1 depicts a single computing device 112, it is understood that implementations may comprise any number computing devices (e.g., client devices) coupled to network 110, server 102, and/or servers 103A-103N. An example computing device that may incorporate the functionality of server 102, servers 103A-103N, and/or computing device 112 is described below in reference to FIG. 7.

In accordance with implementations, computing device 112 may access one or more databases over network 110. Computing device 112 may access one or more databases in a number of ways. In one example embodiment, computing device 112 may include transaction driver 114. Transaction driver 114 is configured to initiate a database transaction. For instance, transaction driver 114 may comprise a client software, machine, or process to generate a plurality of transaction requests 116A-116N and a driver report 118 corresponding to a single distributed transaction. Each of transaction requests 116A-116N may include a request to carry out a portion of a distributed database transaction by various database participants. Each transaction request 116A-116N may include, for instance, a global identifier of a distributed transaction, a participant identifier identifying the database participant, and information related to the operation to be carried out by the database participant. It is noted and understood that although transaction driver 114 is illustrated in FIG. 1 as separate from server 102 and servers 103A-103N, transaction driver 114 may be implemented in one or more of server 102 or servers 103A-103N (or components thereof, such as control database 104 and/or databases 108A-108N). In other words, any one or more of control database 104 and databases 108A-108N may comprise a transaction driver configured to initiate a database transaction as described herein.

Driver report 118 includes a report identifying information associated with the database transaction initiated by transaction driver 114. In examples, driver report 118 may include a set or tuple of information relating to a particular database transaction. Driver report 118 may include, but is not limited to, a global identifier of the distributed transaction, a transaction driver identifier, and an array or listing including one or more participant identifiers that identify participants of the database transaction that are descendants of the transaction driver. Accordingly, when transaction driver 114 initiates a distributed transaction, transaction driver 114 may transmit transaction requests 116A-116N to each of the participants involved in the distributed transaction, along with driver report 118 to control database 104. In examples, transaction driver 114 may transmit transaction requests 116A-116N to the participants and driver report 118 to control database 104 in any order or asynchronously.

As shown in FIG. 1, server 102 comprises control database 104 and servers 103A-103N may comprise databases 108A-108N. Control database 104 includes transaction coordination system 106 configured to control and/or manage distributed database transactions on one or more of control database 104 and databases 108A-108N. Any one or more of server 102 or servers 103A-103N may include one or more server devices and/or other computing devices, co-located or located remotely, comprising, for instance, a cloud-based computing platform.

Server 102, and each of servers 103A-103N (including databases 108A-108N) may also be communicatively coupled to a storage or other repository (locally or remotely located to any of server 102 or servers 103A-103N). Such storage devices may be configured to store data or other information maintained, managed by, and/or accessed by control database 104 and/or databases 108A-108N. In implementations, the storage devices may be configured to store information for hundreds, thousands, millions, and even greater numbers of users, event records, transactions, etc. Control database 104 and databases 108A-108N may comprise any suitable data structure for storing information and are not limited to any particular implementation or format.

Although control database 104 may be implemented in server 102 and databases 108A-108N may be implemented in servers 103A-103N as shown in FIG. 1, it is understood that any one or more of control database 104 and databases 108A-108N may be implemented in or distributed across one or more servers shown in FIG. 1 or any additional devices or servers not shown. For instance, server 102 (or a distributed set of servers) may be configured to implement control database 104 and one or more of databases 108A-108N in some examples. Furthermore, any one or more of control database 104 and databases 108A-108N may be located remotely such that access to each of the databases may be performed via network 110. Any one or more of control database 104 and databases 108A-108N may include any type of physical storage device, including but not limited to one or more local storage devices, and/or one or more cloud-based storages, such as hard disk drives, solid state drives, random access memory (RAM) devices, etc.

In some example embodiments, control database 104 and databases 108A-108N may be implemented on one or more engines of a Structured Query Language (SQL) server, such as a Hekaton engine. For instance, control database 104 and databases 108A-108N may comprise one or more in-memory transactional databases that other applications (such as transaction driver 114) may access. Control database 104 and databases 108A-108N may each comprise a transactional log for identifying or recording transactions carried out on the database in a serialized manner.

Although not shown in FIG. 1, each of control database 104 and databases 108A-108N may also respectively comprise one or more replica databases. For instance, control database 104 and databases 108A-108N may each comprise a primary database on which transactions may be carried out and one or more replicas databases to which such transactions are copied or stored. Where a particular primary database fails, a replica database may automatically take its place and be responsible for carrying out techniques described herein, enabling a seamless failover for coordinating and carrying out different legs of a distributed transaction. In implementations, primary and replica databases need not be implemented on the same machine, but may be distributed across a plurality of machines, implemented in the cloud, etc.

As described above, database transactions may include transactions that involve a plurality of databases. As an illustrative example, a namespace transaction (e.g., creating or deleting a file) may require a plurality of separate operations to be carried out regarding filenames, directories, permissions, etc., in a plurality of different databases, including databases that may be executing on different systems or machines. For instance, if a transaction driver creates a file, a pointer may subsequently be generated that identifies a location of the file (e.g., the particular machines or systems on which the file resides). In such an example, one or more systems may be implemented to manage file-related information, including but not limited to the extent, or data portion(s) of the file. For example, a database (or a plurality of databases) may be implemented to track the name and locations of the file on the various machines or systems, including but not limited to extent management databases and namespace management databases. In other words, when a file is created, therefore, a first transaction may be carried out in the namespace management database, while a second transaction relating to the file creation is also carried out in the extent management database. While both transactions may occur independently of each other (e.g., not at the exact same instant in time), such transactions either both need to take place successfully, or neither transaction should be carried out. In the event each part of such a distributed transaction is not carried out consistently across all of the involved database participants, database inconsistencies may result, such as the inability to locate file extent information indicating the storage location (or locations) of data portions of a file across a datacenter.

As described below in greater detail, transaction coordination system 106 may be configured to manage distributed transactions in a manner to avoid inconsistencies between database participants. In particular, because different database participants may each comprise separate systems and transaction logs, distributed transactions that require a consistent action all involved participants must be carried out in an atomic fashion. Stated differently, each portion of a distributed transaction attributed to various database participants should either all occur, or none of them occur to ensure a consistent outcome.

An illustrative transaction coordination may be carried out as follows. Once transaction driver 114 initiates a distributed transaction, transaction driver 114 may transmit transaction requests 116A-116N to each database participant involved in the distributed transaction. Each of the involved databases (e.g., databases 108A-108N) may create a local transaction representing the respective portion of the distributed transaction and carry out the portion of the transaction (e.g., using the Hekaton engine, or any other execution engine). Upon carrying out the respective portion of the distributed transaction, each database participant may persist, or save the transaction, to a serialized log of a storage device such as a non-volatile memory device or other stable media device to harden the local transaction. Each participant, however, may identify the transaction in its respective transaction log along with an indication or flag that the transaction should remain pending until confirmation of the transaction is received from transaction coordination system 106. Once such a confirmation is received from transaction coordination system 106, it may be recorded in each participant's transaction log. In some examples, the indication or flag may comprise the presence of a global identifier representing a distributed transaction, and a confirmation, once stored in the log, may comprise the same global identifier, thereby linking the pending transaction and the confirmation of the transaction in the transaction log.

Transaction coordination system 106 may determine whether the transaction is committed by all of the distributed transaction participants or should be aborted by all of the participants using a temporary or non-durable table or other data structure for tracking the particular transaction based on reports received from the transaction driver and the involved participants, as will be discussed in greater detail below.

Upon transaction coordination system 106 determining a final outcome of the transaction, the outcome may be stored in a log local to transaction coordination system 106, such as a durable transaction table. Transaction coordination system 106 may also transmit the outcome to each participant and each involved database participant may persist the outcome to its respective log indicating whether the distributed transaction is fully committed or aborted. Once such a confirmation is serialized to the log, the transactional memory relating to the pending transaction in each database participant may be released.

It is noted and understood that implementations described herein are not limited to the illustrative arrangement of FIG. 1 depicting a single transaction coordination system 106 implemented in control database 104. A plurality of transaction coordination systems similar to transaction coordination system 106 may be implemented in control database 104, in one or more of other databases, or one or more cloud-based servers or computing devices, local computing devices, etc., or distributed across any number of databases or systems. For example, when transaction driver 114 generates driver report 118, driver report 118 may be assigned to a particular transaction coordination system among a plurality of coordination systems which may be responsible for coordination of that transaction.

Figure 2:
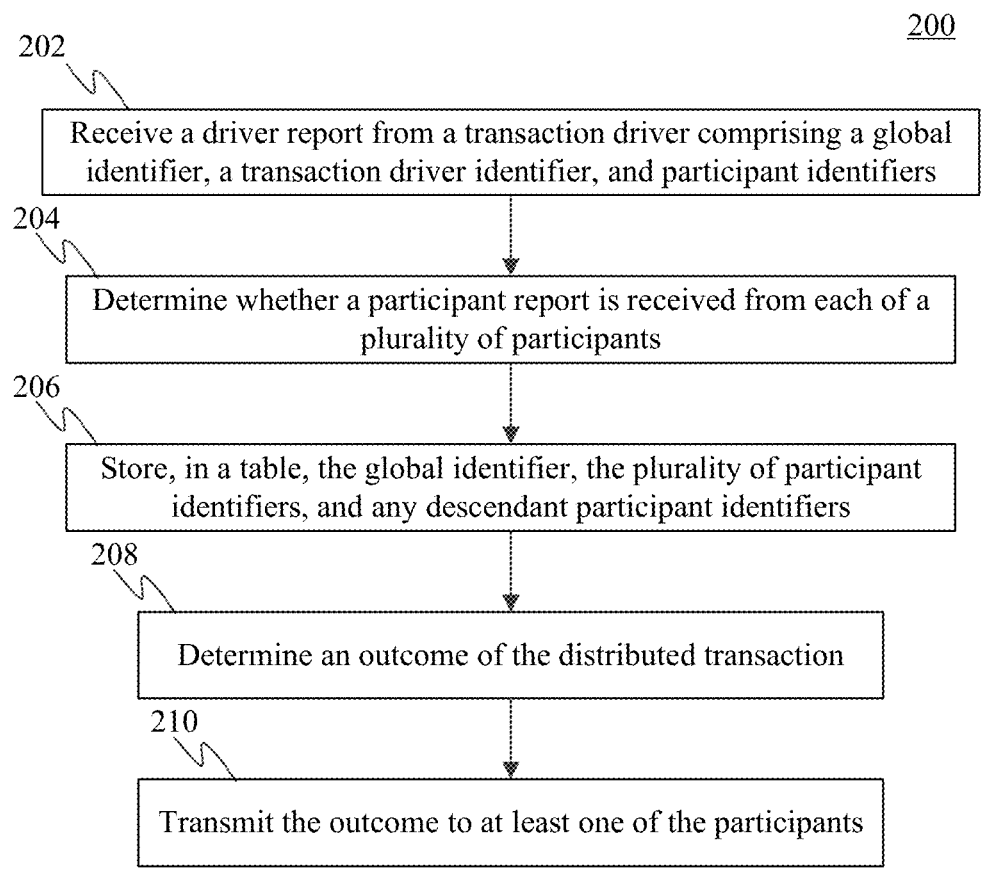
FIG. 2 shows a flowchart of a method for coordinating a distributed transaction involving a plurality of database participants, according to an example embodiment.
Figure 3:
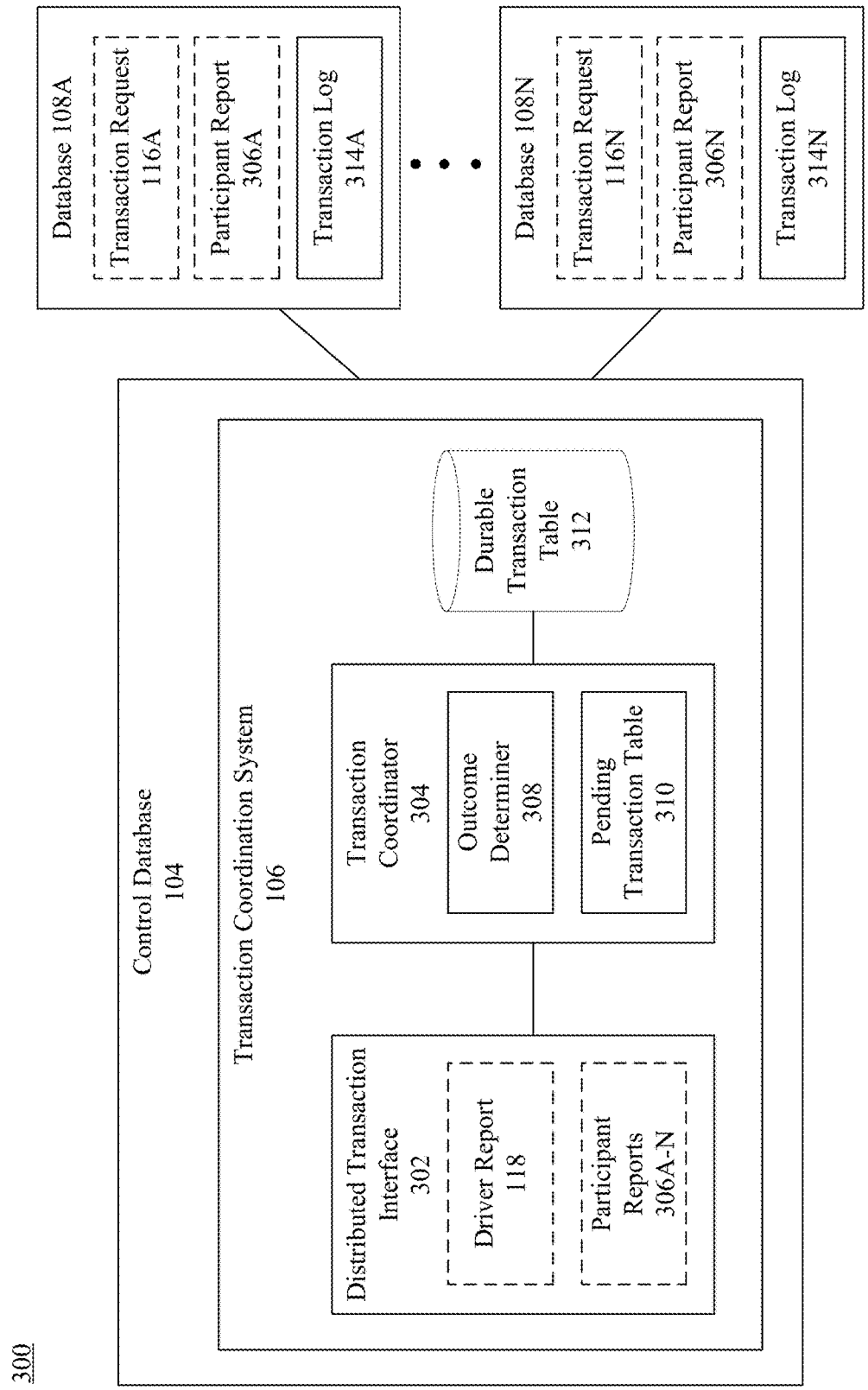
FIG. 3 shows a block diagram of a coordination system for coordinating a distributed transaction, according to an example embodiment.

Transaction coordination system 106 may operate in various ways to coordinate a distributed transaction. For instance, transaction coordination system 106 may operate according to FIG. 2. FIG. 2 shows a flowchart 200 of a method for coordinating a distributed transaction involving a plurality of database participants, according to an example embodiment. For illustrative purposes, flowchart 200 and transaction coordination system 106 are described as follows with respect to FIG. 3. FIG. 3 shows a block diagram of a coordination system 300 for coordinating a distributed transaction, according to an example embodiment. Coordination system 300 is an example implementation of control database 104 and databases 108A-108N of FIG. 1. As shown in FIG. 3, system 300 comprises control database 104 and databases 108A-108N. Control database 104, as shown in FIG. 3, comprises transaction coordination system 106. Transaction coordination system includes a distributed transaction interface 302, a transaction coordinator 304, and a durable transaction table 312. As shown in FIG. 3, distributed transaction interface 302 may include driver report 118 received from transaction driver 114 and participant reports 306A-306N received from each database involved in a particular distributed transaction. Transaction coordinator 304 includes an outcome determiner 308 and a pending transaction table 310. Databases 108A-108N each respectively include one of transaction logs 314A-314N. Furthermore, each of databases 108A-108N involved in a particular distributed transaction may comprise one of transaction requests 116A-116N generated by a transaction driver and generate one of participant reports 306A-316N, as described below. Flowchart 200 and system 300 are described in further detail as follows.

Flowchart 200 of FIG. 2 begins with step 202. In step 202, a driver report is received from a transaction driver that comprises a global identifier, a transaction driver identifier, and participant identifiers that identify descendants of the transaction driver. For instance, with reference to FIGS. 1 and 3, distributed transaction interface 302 may receive a driver report 118 from transaction driver 114. In examples, transaction driver 114 may generate and transmit driver report 118 to distributed transaction interface 302 upon initiation of a distributed database transaction that involves a plurality of databases. Driver report 118 may comprise a global identifier that uniquely identifies the distributed transaction, a transaction driver identifier, and a listing of a participant identifiers, each participant identifier identifying a participant responsible for a portion of the distributed transaction that is a descendant of the transaction driver. It is noted, however, that implementations are not limited to receiving driver report 118 prior to receiving any other reports. Rather, as described later, distributed transaction interface 302 may receive driver report 118 and any one or more participant reports 306A-306N in any order.

The global identifier of the distributed transaction may be any identifier (e.g., a sequence of alphanumeric characters) that uniquely identifies the distributed transaction. In some implementations, the global identifier may be generated by transaction driver 114 (e.g., in a local process). In other implementations, the global identifier may be generated in whole or in part by transaction coordination system 106. The global identifier may be generated in any manner, including but not limited to a sequential manner, a random manner, using a global identifier library, etc. As discussed herein, the global identifier that identifies the particular database transaction may be included in each report or request, such that each distributed transaction (and portions thereof) may be accurately tracked.

The transaction driver identifier may comprise an identifier associated with a reporting entity. For instance, where the reporting entity is transaction driver 114, the transaction identifier included in driver report 118 may comprise a "null" value or other predetermined value or identifier. Such a value (e.g., a null value) may indicate to distributed transaction interface 302 that the received report is being received from an initiator of a distributed transaction in order to distinguish it from other received reports (e.g., participant reports). For example, as described in greater detail below, distributed transaction interface 302 may receive a participant identifier in the same field of a received report, which may indicate that the transmitting entity is one of several database participants (as opposed to a transaction driver). In this manner, database transaction interface 302 may be configured to receive and parse each report in a similar manner, irrespective of the transmitting entity and the order in which the reports are received. As each report is received, transaction coordinator 304 may update pending transaction table 310 based on the information contained within each report to track the entities involved in a particular distributed transaction, as will be described in greater detail below.

Driver report 118 may also comprise a plurality of participant identifiers. Participant identifiers may identify, for a particular distributed transaction, each database participant involved in the transaction identified by transaction driver 114. In example embodiments, each such participant may be responsible for performing or executing a particular portion of the distributed transaction, as identified by the transaction driver. In other words, driver report 118 may identify a plurality of participants, by a respective participant identifier, that are descendants of transaction driver 114 for a given transaction. Participant identifiers may similarly comprise a unique global identifier and may be generated in any manner, including but not limited to similar manner as described above with respect to the generation of global identifiers that identify a transaction. For instance, transaction driver 114 may generate participant identifiers identifying participants of a transaction locally, in conjunction with transaction coordination system 106, or in any other manner.

Upon initiation of a distributed transaction, transaction driver 114 may also be configured to transmit transaction requests 116A-116N to the corresponding database participants identified by the transaction driver as being involved in the database transaction. In implementations, each such transaction request may comprise the same global identifier. Transaction requests 116A-116N may also identify, to each of the involved database participants, a participant identifier that identifies each participant and one or more data operations to be performed in connection with the distributed transaction. Each database participant, upon receiving transaction requests 116A-116N, may carry out its respective portion of the distributed transaction and save the transaction to its transaction log (one of transaction logs 314A-314N). Each distributed transaction saved to the transaction log may comprise, among other things, the global identifier of the distributed transaction. In this manner, databases may readily determine which transactions are distributed transactions that involve other database participants, and which transactions are local (i.e., transactions not accompanied by a global identifier and do not involve other participants).

As an illustrative example, upon initiation of a transaction involving a plurality of database participants, transaction driver 114 driver may be configured to transmit driver report 118 to distributed transaction interface 302 comprising the global identifier of the transaction, the transaction driver identifier, and participant identifiers of the participants that are responsible for portions of the distributed transaction. In parallel, transaction driver 114 may transmit transaction requests 116A-116N to the various participants responsible for the portions of the distributed transaction. As used herein, the parallel transmission of driver report 118 and transaction requests 116A-116N is not intended to be limited to any particular order of transmission. Rather, transaction driver 114 may transmit any one or more of transaction requests 116A-116N to the respective database participant prior to, at the same time, or after, transmission of driver report 118 to distributed transaction interface 302.

In step 204, it is determined whether a participant report is received from each of a plurality of database participants. In implementations, each participant report may include the global identifier identifying the transaction, the participant identifier of the participant, an identification of any descendant participant identifiers identifying descendants of the participant (e.g., in an array or listing), and a status of the portion of the distributed transaction of the participant. For instance, with reference to FIG. 3, each database participant involved in the distributed transaction may transmit its respective one of participant reports 306A-306N to distributed transaction interface 302.

Each participant report may comprise a tuple of information similar to driver report 118. In some examples, the participant report may comprise the same or similar structure as driver report 118. For instance, participant reports may be transmitted to distributed transaction interface 302 using a suitable network call, API, etc., similar to driver report 118. In other words, participant reports from databases 108A-108N may contain the same global identifier generated by transaction driver 114 to identify the particular distributed transaction, the identifier of the reporting participant, identifiers associated with any descendant participants that are descendants of the reporting participant, and an outcome or status of the portion of the distributed transaction of the reporting participant. In examples, the identifier of the reporting participant may comprise the unique participant identifier generated by transaction driver 114.

In some instances, a database participant identified by transaction driver 114 as being responsible for a portion of a distributed transaction may determine that one or more additional database participants are needed to carry out additional operations with respect to the same distributed transaction. Accordingly, any one or more of databases 108A-108N (e.g., a parent participant) involved in a particular distributed transaction may identify one or more descendant participant databases (not shown in FIG. 3) by generating a transaction request to each descendant participant in a similar manner as described above with respect to transaction driver 114, as well as identifying the descendant participant identifier(s) generated by the parent participant. In addition, the parent participant may identify, in its participant report to transaction interface 302, the identifiers of such descendant participants that were added to the transaction. In this manner, distributed transaction interface 302 may become aware of every participant involved in a particular transaction, even if a particular participant is not identified directly by transaction driver 114.

Participant reports 306A-306N may also include a status of the portion of the distributed transaction for each reporting participant. For example, if a participant successfully performed or executed its respective portion of a distributed transaction, the participant may record the transaction in the participant's transaction log and indicate, in its corresponding participant report, that the participant has committed to the transaction. However, because the serialized transaction in the log comprises a global identifier that identifies it as a distributed transaction, the transaction remains in a pending or "in progress" state until a confirmation is later received from transaction coordinator 304 (described in greater detail below). In other words, each distributed transaction recorded in a participant's transaction log may remain in a pending state and will be uncommitted in memory until a confirmation is received from transaction coordinator 304. Until such time that a confirmation is received, the pending transaction may be visible to other operations and other transactions may take a dependency on the pending transaction, but these other transactions remain in a pending state until a confirmation received from transaction coordinator 304 is serialized to the transaction log of the participant.

In some instances, however, a distributed transaction may need to be aborted. For example, a participant may not have successfully executed its portion of a particular transaction with regard to its database. In such an example, the participant may identify, in its participant report, that the participant has aborted the transaction. In other examples, not all participants in a given distributed transaction may transmit a participant report to distributed transaction interface 302 despite being involved in the transaction. For example, if a particular participant did not receive a transaction request from transaction driver 114 (e.g., due to a connection or network error, or any other communication error), the participant may not execute its portion of the distributed transaction. In such a scenario, because the participant is entirely unaware of the transaction, the participant may not transmit a participant report to distributed transaction interface 302 to confirm the transaction.

Accordingly, distributed transaction interface 302 may determine whether a participant report was received from each participant involved a particular distributed transaction that indicates, among other things, whether the participant has confirmed the transaction. As described in greater detail below, if all involved participants confirm their respective portions of the same transaction, transaction coordination system 106 may confirm the transaction for all of the participants.

In step 206, the global identifier, the plurality of participant identifiers, any descendant participant identifiers of each participant, and the status of the portion of the distributed transaction for each of the participants that transmitted a participant report are stored in a table. For instance, with reference to FIG. 3, transaction coordinator 304 may store, in pending transaction table 310, the global identifier associated with the distributed transaction, the plurality of participant identifiers (including participants identified by a transaction driver and participants identified by other database participants, and for each participant that transmitted a report, the status of the portion of the distributed transaction. In this manner, transaction coordinator 304 may track the status of a distributed transaction involving multiple participants.

In accordance with implementations, pending transaction table 310 may comprise a temporary or non-durable table or other suitable data structure for tracking the progress and entities involved in a particular distributed transaction. Pending transaction table 310 may be configured to construct a hierarchy for a given transaction on-the-fly as transaction coordinator 304 receives reports from various entities involved the transaction. For instance, if pending transaction table 310 does not comprise such a structure for a given transaction (i.e., the global identifier is not found in the table), the first report received with the global identifier may trigger the construction of an in-memory structure representing the transaction. In one example, transaction coordinator 304 may receive driver report 118 prior to receiving any of participant reports 306A-306N. In such an example, pending transaction table 310 may initiate the creation of the in-memory structure (e.g., one or more entries in the pending transaction table) for the transaction, and identify each of the database participants identified in driver report 118. If one or more participant reports 306A-306N are subsequently received, information in the table corresponding to the global identifier may be updated. For instance, if the participant identifier corresponding to the reporting participant is already present in the table, the table may be updated to indicate that the participant has confirmed the transaction. Furthermore, the reporting participant in such a scenario may identify one or more additional descendant participants that may not exist in the table. For each such new descendant participant, a corresponding descendant participant identifier may be added in pending transaction table 310 (e.g., at the end of a linked list) under the same global transaction identifier.

It is noted, however, that in some other illustrative examples, one or more of participant reports 306A-306N may be received by distributed transaction interface 302 prior to receiving driver report 118. In such examples, transaction coordinator 304 may generate the structure corresponding to the transaction in pending transaction table 310 in a similar manner by creating an entry for the global transaction identifier and adding the reporting participant identifier, any descendant participant identifiers, and the status of the portion of the transaction of the reporting participant. If other reports (e.g., driver report 118 and/or one or more other participant reports 306A-306N) are subsequently received, transaction coordinator 304 may update pending transaction table 310 with the received information. Therefore, such a process may be iteratively performed for each report received in an idempotent manner, thereby enabling transaction coordinator 304 to generate and update pending transaction table 310 on-the-fly to create a complex tree or hierarchy of the distributed transaction irrespective of the order in which reports are received.

In some example embodiments, pending transaction table 310 may comprise a hash map, hash table, or other in-memory structure for storing a linked list of participants of a pending transaction. For instance, when transaction coordinator 304 obtains a global identifier of a distributed transaction, from either a transaction driver or a participant, a hash value may be calculated. Based on the hash value, a corresponding bucket of a hash map may be selected for storing information associated with the same global identifier. In a further implementation, the hash map may comprise an in-memory lock-free hash map, such as a lock-free hash map stored on or more volatile storage devices, random access memory (RAM) devices, etc. In a lock-free hash map, for example, updates to pending transaction table 310 may enable a plurality of different processing threads to carry out the same operation simultaneously in memory without blocking other operations from taking place. As an example, operations performed by control database 104, including but not limited to updating pending transaction table 310, may comprise one or more Interlocked.CompareExchange (ICX) operations as appreciated by those skilled in the art that may enable operations to be carried out (and re-attempted, if necessary) by a plurality of processing threads (e.g., in a multi-threaded system) in an atomic fashion. As a result, pending transaction table 310 may be updated in an efficient, lock-free, and idempotent manner.

In step 208, an outcome of the distributed transaction is determined using the table. For instance, with reference to FIG. 3, outcome determiner 308 may be configured to determine an outcome of the distributed transaction corresponding to the global identifier using pending transaction table 310. As discussed above, pending transaction table 310 may dynamically construct hierarchy of a distributed transaction that involves a plurality of database participants. For example, if each of the participants and/or descendant participants, whether identified by transaction driver 114 or by any other database participant, transmits a respective participant report to distributed transaction interface 302 indicating that the reporting participant has committed to the transaction, pending transaction table 310 may store such indications. Based on these indications identifying that all participants and descendant participants involved in a particular transaction have committed to the transaction, outcome determiner 308 may determine that the distributed transaction is in a fully committed state.

In some other examples, outcome determiner 308 may determine that a particular distributed transaction is in progress or not complete. For instance, if participants or descendant participants have been added to pending transaction table 310 by one entity (e.g., transaction driver 114), but the participant and/or descendant participant have not yet transmitted its participant report, outcome determiner 308 may determine that the transaction is not complete due to one or more participant reports that have not yet been received that confirm the transaction.

In yet another example, outcome determiner 308 may determine that a particular distributed transaction should be aborted. For instance, if any one participant or descendant participant fails to commit to a transaction, such as where an execution or other transaction error has occurred on the database, the participant or descendant participant may transmit a participant report indicating that the reporting participant has aborted the portion of the transaction attributed to the participant. In such an example, pending transaction table 310 may store an indication of the aborted transaction by the reporting participant and outcome determiner 308 may thereby determine that all participants involved in the same transaction should abort the transaction. In some other examples, outcome determiner 308 may be configured to determine that a particular participant or descendant participant has aborted a portion of a transaction attributed to it based a failure to receive a report after a passage of time (e.g., where the participant does not transmit a report after a certain number of seconds, minutes, etc.). For example, if a particular participant fails to transmit a participant report confirming the transaction after a predetermined period of time, outcome determiner 308 may determine that the transaction, in its entirety, should be aborted due to the failure of one of the participants in committing to the transaction. In such an example, outcome determiner may record the transaction as an aborted transaction in durable transaction table 312 and/or transmit the transaction outcome to one or more of the involved participants indicating that the transaction should be aborted. Accordingly, in the manner described herein, transaction coordinator 304 may be able to manage and track the progress of complex distributed transactions involving multiple participants and accurately determine whether the transaction is fully committed or should be aborted.

In a further example embodiment, upon determining the outcome of a transaction, transaction coordinator 304 may be configured to store the outcome in durable transaction table 312. Durable transaction table 312 may comprise one or more transaction tables, arrays, lists, or other data structures for storing a final determined outcome of distributed transactions (whether committed or aborted). For instance, durable transaction table 312 may comprise one or more permanent tables, such as tables that are stored or persisted to a non-volatile storage or memory device. In some further implementations, upon storing such an outcome to durable transaction table 312, the transaction (e.g., all entries corresponding to the same global identifier) may be cleared from pending transaction table 310, such that the memory (e.g., volatile memory of the in-memory hash table) is freed and therefore made available for other purposes or transactions. Such an approach to harden the completed transaction in a durable transaction table is advantageous because it does not require a complex series of transactions to take place on a permanent storage device that typically has slower read/write speeds than in-memory devices. Rather, operations to coordinate a distributed transaction may be carried out in a faster lock-free memory as described herein, and subsequently saved to durable table 312 with a single transaction once the final outcome is determined.

In step 210, the outcome of the distributed transaction is transmitted to at least one of the participants. For example, with reference to FIG. 3, distributed transaction interface 302 may be configured to transmit the outcome of the distributed transaction determined by outcome determiner 308 to any one or more of databases 108A-108N. As discussed previously, the outcome of a particular distributed transaction may comprise a variety of states, including that the transaction is fully committed, aborted, or the transaction is pending (i.e., awaiting one or more additional participant reports).

In some examples, distributed transaction interface 302 may transmit the outcome to one or more (or all) of databases 108A-108N involved in the transaction automatically and/or in response to a request by one of such participants, or in response to any other event. Similarly, distributed transaction interface 302 may be configured to transmit the outcome of the distributed transaction to transaction driver 114 automatically (e.g., upon determining the final outcome) or in response to a driver request for an outcome.

It is noted and understood that although it is described in an example that the outcome of the distributed transaction may be transmitted to at least one of the participants of a particular distributed transaction, such a transmission (or transmissions) of the outcome may not occur in some implementations. For instance, distributed transaction interface 302 may not transmit an outcome to any of the involved participants. As an illustrative example, all involved participants (databases 108A-108N) may transmit a respective participant report indicating that a particular transaction is aborted and subsequently crash after transmitting the report. In such an example, outcome determiner 308 may determine that the outcome of the transaction is to abort the transaction and record the outcome to durable transaction table 312. However, because each of the database participants has crashed and the database participants may no longer have any record of the aborted transaction, the database participants may no longer be aware of the aborted transaction. As a result, the participants may not transmit a subsequent participant report to the coordinator relating to this transaction and the coordinator need not transmit (or re-transmit, in some instances) the outcome of the transaction to the involved participants. If, however, a participant report is subsequently received for this transaction, the distributed transaction interface 302 may determine that the transaction outcome has already been determined based on information in durable transaction table 312, and transmit the outcome to the reporting participant at that time.

Upon receiving an outcome of a distributed transaction, participants involved in the distributed transaction may cause transaction logs 314A-314N to be serialized with the final outcome. Transaction logs 314A-314N may be updated in a variety of ways. For example, transaction logs 314A-314M may include a serialized entry in the transaction log that identifies the completed distributed transaction by its global identifier, along with the final outcome (e.g., committed or aborted) of the transaction. As a result, the pending distributed transaction may become linked with the transaction outcome, thereby enabling the transaction to become hardened in each participant's log.

In this way, each of transaction logs 314A-314N, upon receiving the final outcome for a particular transaction, may become self-sufficient with respect to the particular distributed transaction that involves a plurality of other independent database participants. In other words, any one of databases 108A-108N may determine, based entirely on its local transaction log, the state of a distributed transaction for which a final outcome has been reported by transaction coordination system 106. Accordingly, for such distributed transactions for which final outcomes have been reported to the involved participants, the database participants need not interact with control database 104, or any other entity, to confirm the transaction outcome.

In accordance with embodiments described herein, distributed transactions involving a plurality of database may therefore be coordinated accurately and consistently. One non-limiting illustrative process for coordinating a distributed transaction is described as follows. As discussed previously, a distributed transaction may be initiated by a transaction driver and be assigned a global identifier (D1, in this example). The transaction driver may transmit a driver report to control database, and also transmit a transaction request to each of a plurality of databases involved in the transaction. As described above, the database participants may each transmit a participant report to the control database upon confirming their respective portions of the distributed transaction. The control database (e.g., control database 104) responsible for coordinating the transaction may receive a driver report or any of the participant reports in any order.

Upon receiving a report from any of the entities involved in the transaction, control database 104 may first determine whether the global identifier in the report is present in a durable transaction table (e.g., durable transaction table 312). If the global identifier is present in the durable table, outcome determiner 308 has previously determined a final outcome of the transaction corresponding to the global identifier (D1) and may cause transaction coordinator 304 to transmit the outcome back to the reporting participant (e.g., identifying whether the transaction was committed or aborted based on information stored in the durable table).

If the durable table does not contain the global identifier, a final outcome of the distributed transaction has not been reached and the transaction may be determined to be "in progress." In such a scenario, transaction coordinator 304 may determine whether pending transaction table 310 comprises an existing entry corresponding to the global identifier identified in the received report. If not, transaction coordinator 304 may create a new entry identifying the global identifier (D1) and insert information received in the driver report or participant report as described above. In examples, the information in pending transaction table 310 for a particular global identifier may comprise an outcome state that is first initialized with an "in progress" state upon generation that may later be updated to "committed" or "aborted." An "in progress" state may indicate that transaction coordinator is awaiting the receipt of one or more reports (e.g., a participant report, a descendant participant report, or a driver report) before confirming the transaction in its entirety.

If the global identifier is present in pending transaction table 310, transaction coordinator 304 may update the information corresponding to the global identifier with the information in the received report. As a result, pending transaction table 310 may generate a linked list of participants involved in a particular distributed transaction that is continuously updated as additional reports are received. In this manner, transaction coordinator 304 may dynamically create a hierarchy of a distributed transaction without requiring any the structure of the transactions to be modeled (including identification of its participants) or known before the transaction is initiated.

In accordance with implementations, each participant identified in a linked list of pending transaction table 310 may comprise three states: added by a parent, added by a descendant, or both confirmed. When a reporting entity transmits a report containing one or more participant identifiers (a reporting participant identifier and/or any identifiers of descendant participants), the state associated with any of the identified participants may be added or updated in pending transaction table 310. If the received report identifies a particular participant for the first time (i.e., the participant identifier is not already in pending transaction table 310), the new participant is either added to pending transaction table 310 as "added by a parent" or "added by a descendant," depending on whether the new participant was added to pending transaction table 310 by a parent entity (such as transaction driver 114 or a parent participant), or if the new participant was added to the table by the reporting participant itself.

Once added to pending transaction table 310, the states of "added by a parent" and "added by a descendant" may be updated to a "both confirmed" state based on the receipt of a subsequent report. For instance, if driver report 118 is the first entity to identify a database participant (P1 in this example) to control database 104, participant P1 may be added to pending transaction table 310 with a state of "added by a parent." If participant P1 subsequently transmits a participant report confirming its portion of the transaction, pending transaction table 310 may update the state of participant P1 to "both confirmed," since the parent (transaction driver 114 in this example), and the descendant (participant P1) have both confirmed the transaction. In a similar fashion, the state may change from "added by a descendant" to "both confirmed" where control database 104 first receives the participant report from participant P1 confirming the portion of the transaction prior to receiving the report from the parent entity (e.g., the transaction driver). In some examples, outcome determiner 308 may determine a transaction is fully committed only where all participants identified in pending transaction table 310 for a given transaction comprise a "both confirmed" state.

It is noted, however, that parent and descendant participants are not limited to the examples described. In particular, parent participants may include any parent entity that identifies a participant database to a transaction, while descendant participants may include any descendant entity that has been added to the distributed transaction by another entity.

In some examples, participant identifiers identified in a received report (e.g., a driver report or a participant report) may be added to pending transaction table 310 prior to taking other actions, including determining an outcome of the transaction. For instance, because actions taken by control database 104, including any modifications to pending transaction table 310, may be performed in accordance one or more ICX operations, parallel threads may result in a premature outcome being determined for a distributed action while pending transaction table 310 is being updated. As an example, control database 104 may first receive a driver report identifying a particular participant P1 (among other participants), and subsequently receive a participant report from participant P1 confirming its respective portion of the transaction, but also adding a new participant (e.g., participant P3) to the transaction. If pending transaction table 310 is updated to change participant P1 to a "both confirmed" state prior to adding participant P3 to the table, outcome determiner 308 may prematurely determine that the distributed transaction has reached a final state if all other participants in the table are also in a "both confirmed" state. To avoid such a premature conclusion, transaction coordinator 304 may be configured to first add descendant participant identifiers to pending transaction table 310. As a result, outcome determiner 308 may become aware that it should await a report from the newly identified descendant participants prior to reaching a final outcome with respect to the transaction as a whole.

In some example embodiments, where driver report 118 is received first by control database 104, transaction coordinator 304 may add the transaction driver identifier ("null" in this example) as "added by a parent" in pending transaction table 310. In other words, the transaction driver itself may be added as a participant in the linked list of pending transaction table 310 with a pending state. Upon adding the transaction driver, transaction coordinator 304 may identify each of the participants identified in the driver report as "added by a parent" in the linked list of pending transaction table 310. After this operation, transaction coordinator 304 may update the transaction driver identifier ("null") in the linked list as "added by a descendant," thereby rendering the transaction driver in a "both confirmed" state. By enabling the transaction driver to remain in a pending state in this manner, transaction coordinator 304 may similarly prevent outcome determiner 308 from prematurely reaching a final conclusion on the distributed transaction prior to adding one or more participants in pending transaction table 310.

Outcome determiner 308 may be configured to iterate through the linked list of participants in pending transaction table 310 to determine whether all of the identified participants are in a "both confirmed" state. If all of the identified participants for a particular transaction are in such a state (i.e., the transaction is confirmed by the parent and the descendant entity), outcome determiner 308 may thereby determine that the transaction is in a fully committed state. In other words, the list for the particular transaction becomes immutable at this point, as no more participants will be added to pending transaction table 310 for the transaction. As described above, outcome determiner 308 may further be configured to change the transaction state from "in progress" to "committed," transmit the outcome to one or more participants involved in the transaction, and store the transaction in durable transaction table 312 upon determining a final outcome. It is noted, however, that if a particular reporting entity transmits a report indicating that the status of the portion of the transaction of the participant is aborted, the "outcome" state of the distributed transaction may be updated from an "in progress" state to an "aborted" state, which may result in aborting the entire distributed transaction.

Figure 4A:
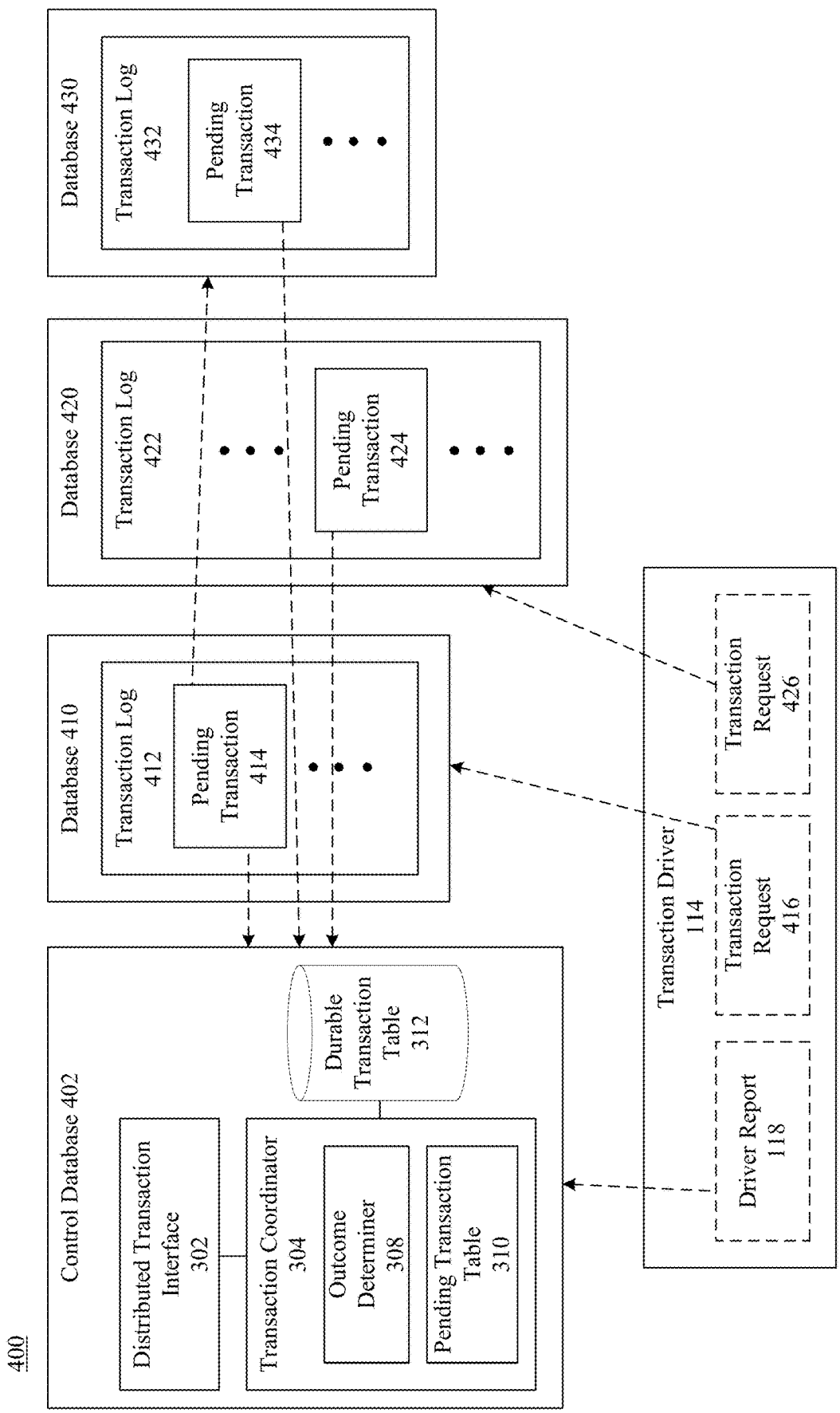
FIGS. 4A-4B show block diagrams depicting coordination of a distributed transaction, according to an example embodiment.
Figure 4B:
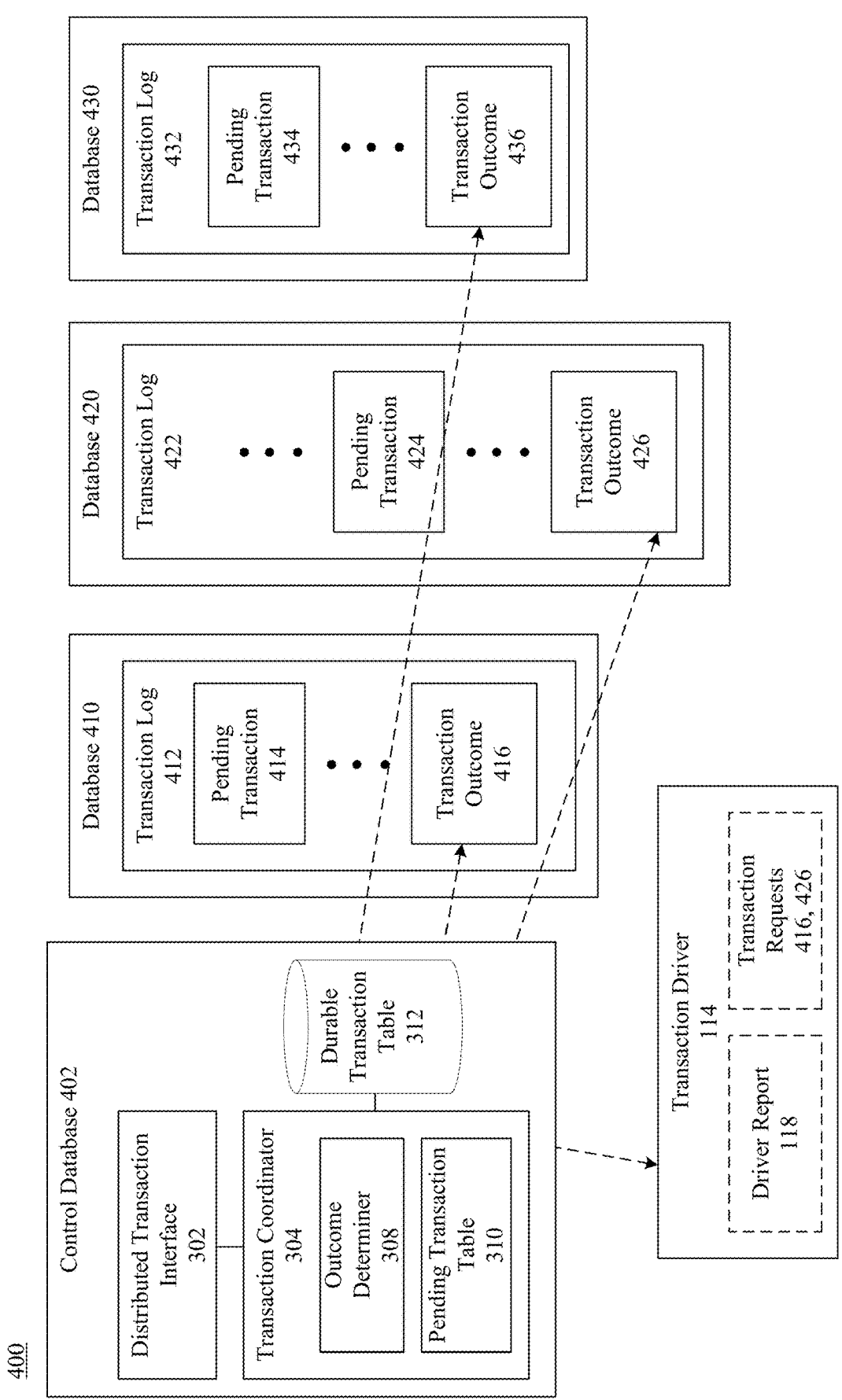

FIGS. 4A-4B show block diagrams depicting an illustrative coordination of a distributed transaction in accordance with the above process, according to an example embodiment. Each of FIGS. 4A-4B show a system 400 for coordinating a distributed transaction, with system 400 including a control database 402, a database 410, a database 420, a database 430 and a transaction driver 114. In the illustrative implementation of FIGS. 4A-4B, control database 402 may be an example of control database 104. Database 410, database 420, and database 430 may be examples of databases 108A-108N that are involved in a particular distributed transaction.

In the example of FIGS. 4A-4B, a distributed transaction may be initiated by transaction driver 114 and be assigned a unique global identifier D1. Transaction driver 114 may transmit driver report to control database 402. Transaction driver 114 may also transmit a transaction request 416 to database 410 and a transaction request 426 to database 420. In examples, transaction request 416 and transaction request 426 are examples of transaction request 116A-116N. Transaction driver 114 may transmit driver report 118 to control database 402 and transaction requests 416, 426 to databases 410, 420 in any particular order. For instance, driver report 118 may be transmitted before, after, in between, or simultaneously as any of transaction requests 416, 426.

As shown in FIG. 4A, database 410 may identify database 430 as a new descendant participant to the same transaction (D1) by transmitting a transaction request to database 430. Thus, as shown in FIGS. 4A-4B, transaction driver 114 may be a parent entity of database 410 and database 420, while database 410 and database 420 are descendants of transaction driver 114. Similarly, database 410 may be a parent entity of database 430 by virtue of adding database 430 to the same transaction. As described in greater detail below, any of database 410, 420, and 430 may transmit a respective participant report to control database 402 upon confirming their respective portions of the distributed transaction. It is understood that these examples are not intended to be limiting, and may include any number and combination of parent and/or descendant entities for any distributed transaction.

In the illustrative example of FIGS. 4A-4B, driver report 118 includes the global identifier (D1) of the distributed transaction, the identifier of the transaction driver (which may be "null" in this example), the identifiers of participants of the distributed transaction that are descendants of transaction driver 114 (a list of descendants comprising P1, which identifies database 410, and P2, which identifies database 420 in this example). The global identifier (D1) and the participant identifiers (P1, P2) of driver report 118 may be generated by transaction driver 114. In some examples, driver report 118 may comprise the same format as participant reports described herein such that the same network call and/or API may be used to communicate with control database 402. In such examples, driver report 118 may also comprise a commit or abort status indicating whether transaction driver 114 has committed to or aborted the distributed transaction, similar to the status indicator included in participant reports described previously.

In the illustration shown in FIG. 4A, database 410 may receive transaction request 416 directed to it that includes the global identifier (D1) of the distributed transaction, the participant identifier of database 410 (P1), and the database operation to be performed by database 410 (e.g., payload data, instructions, etc.). Similarly, database 420 may receive transaction request 426 directed to it that includes the global identifier of the distributed transaction (D1), the participant identifier of database 420 (P2), and the database operation to be performed by database 420.

As described above, database 410 may determine that a separate database participant (i.e., database 430) needs to carry out an operation in connection with the same distributed transaction. Accordingly, in this illustrative example, database 410 may identify database 430 as a descendant of database 410 and assign the descendant database a descendant participant identifier (P3 in this example). Database 410 may thereby transmit a transaction request to database 430 comprising the same global identifier (D1) of the distributed transaction, the descendant participant identifier (P3) that identifies database 430, and an operation to be performed by database 430 in connection with the transaction. In some other implementations, transaction driver 114 or another entity may generate the descendant participant identifiers.

Upon confirming the portion of the transaction contained in transaction request 416 and initiating the transaction request to database 430 (participant P3), database 410 may store an indication as a pending transaction 414 in a transaction log 412. Transaction log 412 is an example of one of transaction logs 314A-314N and may comprise a serialized transaction log configured to store any number of transactions on database 410, including but not limited to any number of distributed transactions or local transactions (i.e., non-distributed transactions that do not involve other database participants). In examples, pending transaction 414 may identify the transaction by the global identifier (D1) indicating that the transaction is a distributed transaction involving other database participants. As a result, pending transaction 414 remains in a pending state until a confirmation of the transaction appears later in the transaction log. It is also noted that in addition to the global identifier, additional information relating to the transaction may be serialized to transaction log 412 relating to pending transaction 414, including but not limited to the participant identifier (P1 in this example), any descendant participant identifiers (P3 in this example), and/or the status of the portion of the transaction of the participant (e.g., a commit or abort status). In this way, pending transaction 414 may comprise the information to be included in a subsequent participant report that is re-transmitted to control database 402, such as where the report was not received or the control database 402 crashes.

Upon storing the distributed transaction as pending transaction 414, database 410 may transmit a participant report as described above to control database 402 via a network call or any other manner. The participant report of database 410 in this illustrative example may identify the global identifier of the distributed transaction (D1), the identifier of the reporting participant (i.e., the participant identifier of database 410, or P1 in this example), the identifiers of any descendant participants (i.e., the descendant participant identifier of database 430, or P3 in this example), and a status of the portion of the transaction of database 410 (e.g., a commit or abort status). As a result, even if driver report 114 does not identify the descendant participant as being a participant in the transaction, transaction coordinator 304 may nevertheless become aware of any descendant participants that are identified by other database participants through receipt of participant reports. Accordingly, because transaction coordinator 304 becomes aware of each participant of the distributed transaction in a dynamic manner, transaction coordinator 304 may determine which entities from which it must await a response before a final transaction outcome may be determined.

Database 430 may operate in a similar manner. For example, database 430 may receive the transaction request from database 410 and store the transaction in a transaction log 432 as a pending transaction 434. In this example, pending transaction 432 may similarly identify the distributed transaction by the same global identifier (D1). Upon storing the transaction in transaction log 432, database 430 may transmit a descendant participant report using a network call as described previously to control database 402. The descendant participant report may comprise a similar format as the participant report transmitted by database 410. In this example, the descendant participant report may include the same global identifier (D1), the identifier of the reporting participant (i.e., the identifier of database 430, or P3 in this example), the identifiers of any additional descendant participants (none in this example), and a status of the portion of the transaction attributed to database 430 (e.g., a commit or abort status).

Database 420 may similarly receive transaction request 426 from transaction driver and store the transaction in a transaction log 422 as a pending transaction 424 as described above. Upon storing the transaction as pending transaction 424, database 420 may similarly transmit a participant report to transaction coordinator 304 using a network call or other technique. In this example, the participant report of database 420 may include the global identifier (D1), the identifier of the reporting participant (i.e., the participant identifier of database 420, or P2 in this example), any identifiers of descendant participants (none in this example), and a status of the portion of the transaction of database 420 (e.g., a commit or abort status).

It is noted and understood that the particular arrangement of FIGS. 4A-4B is illustrative only, and may comprise any number of databases, participants, descendant participants, transaction drivers, and control databases. For example, although not shown here, any one or more of database 410, 420 or 430 may comprise any number of additional descendant participants not illustrated. Each such additional descendant participant may be configured to store, in a respective transaction log, a pending transaction identifying the distributed transaction, and transmit a participant report to control database 402 as described above.

As discussed herein, transaction coordinator 304 may store information obtained in each participant report and driver report 118 in pending transaction table 310 as it is received. For example, if transaction coordinator 304 first receives a participant report from one of databases 410, 420, or 430, the received participant report may initiate the generation of the one or more entries in pending transaction table 310 corresponding to the global identifier (D1). Similarly, if transaction coordinator 304 receives driver report 118 first, the received driver report may initiate the generation of the entries in pending transaction table 310 corresponding to the global identifier. Each subsequently received report for the same global identifier may enable transaction coordinator 304 to update pending transaction table 310. In this manner, transaction coordinator 304 may be configured to populate pending transaction table 310 corresponding to a particular transaction irrespective of the order in which reports are received.

FIG. 4B depicts the illustrative example of FIG. 4A once outcome determiner 308 determines a final outcome of the distributed transaction. For instance, after receiving a driver report and/or a plurality of participant reports for a particular distributed transaction (designated by the global identifier D1 in this example), pending transaction table 310 may comprise a plurality of participant identifiers involved in the transaction and whether each participant has committed or aborted its respective portion of the transaction.

As described above, pending transaction table 310 may indicate that a particular participant is fully committed if two separate reports corresponding to the participant are received by distributed transaction interface 302. In particular, when the particular participant is first identified to transaction coordinator 304, the participant identifier may be initially added to pending transaction table 310. For instance, if transaction driver 114 first identifies the participant, pending transaction table 310 may add the participant and store an indication that the participant was "added by a parent" (e.g., the parent being the transaction driver in this example). Conversely, if the participant itself responds with a participant report before driver report 118 is received, pending transaction table 310 may add the participant to the table and store an indication that the participant was "added by a descendant" (e.g., the descendant being the participant since it is the descendant of the transaction driver). Once the participant is first added to the table as either being "added by a parent" or "added by a descendant," transaction coordinator 304 may await the appropriate report from the other entity (e.g., await a report from the driver if the participant reports first, or await a report from the participant if the driver reports first).

In the above example, where both reports are received (i.e., the report adding a participant by a parent and the report from the participant itself), pending transaction table 310 may be updated to store an indication that the participant is in a "both confirmed" state. If either the parent or the descendant fails to confirm or transmits an abort status, the portion of the transaction for the particular participant may be aborted. In such examples, pending transaction table 310 may be updated to indicate that the particular participant has aborted the transaction. By awaiting a report for both entities involved in the portion of the transaction for a particular participant, transaction coordinator may ensure that this portion of the distributed transaction is appropriately confirmed.

If, in the above example, pending transaction table 310 indicates a "both confirmed" state for all participant identified for a given transaction, outcome determiner 308 may determine that the transaction, as a whole, has a final confirmed state. In examples, such a final state may be a fully committed state where every parent entity and descendant entity identified in pending transaction table 310 have committed to respective portions of a transaction. In other examples, if any entity fails to commit to a transaction after a predetermined period of time or has aborted a portion of the transaction, outcome determiner 308 may determine that the transaction in its entirety should be aborted by all entities.

Once outcome determiner 308 determines an outcome of the transaction, transaction coordinator 304 may transmit the outcome to one or more of the entities involved in the distributed transaction, including database 410, 420, 430, and/or transaction driver 114 as shown in FIG. 4B. The outcome of the transaction may be stored as a transaction outcome 416, 426, and 436 in transaction logs 412, 422, and 432, respectively. In implementations, transaction outcome 416, 426, and 436 may comprise the same global identifier as pending transaction 414, 424, and 434, along with a final outcome of the distributed transaction (e.g., whether the transaction was committed or aborted by all involved participants), thereby enabling the transaction outcome to be linked to the pending transaction in the log. Accordingly, when a pending transactions is linked to a transaction outcome in the transaction log, the transaction no longer remains in a pending state and may be fully committed (e.g., permanent in memory) or aborted (e.g., rolled back).

It is also noted that in the above examples, transaction coordinator 304 may be configured to receive multiple participant reports or driver reports from the same entity without having an adverse impact on the coordination of the distributed transaction. For instance, any one or more of databases 410, 420, or 430 may shut down, freeze, lose network connectivity, crash, etc., which may result in rebooting of the database and/or a temporary duration in which the database was offline. In such scenarios, the database that rebooted or went offline may have one or more pending distributed transactions identified in its transaction log without a corresponding transaction outcome. In these examples, the database that rebooted or went offline may search through its transaction log to identify any such distributed transactions that are in a pending state following recovery, and re-transmit a participant report to transaction coordinator 304 in the same manner as described above (e.g., indicating the global identifier, the reporting participant identifier, any descendant participant identifiers, and a status of the transaction). Upon receiving the participant report, control database 402 may determine if an outcome has previously been determined (e.g., by searching durable transaction table 312). If not, control database 402 may determine if the information in the received report is already in pending transaction table 310 from a previous transmission of the same report, or add the information to the table if it is not already present. As a result, transaction coordinator 304 may be configured to update pending transaction table 310 in an idempotent manner and seamlessly coordinate transactions involving participants that may have temporarily failed for any number of reasons.

Similarly, if control database 402 reboots, temporarily goes offline, or otherwise loses the information contained within pending transaction table 310 for a particular transaction, transaction coordinator 304 may automatically reconstruct and/or repopulate pending transaction table 310 with information for the transaction. For instance, where control database 304 crashes and pending transaction table 310 is lost for pending transactions, each of the entities involved in the transaction may retransmit their respective reports to transaction coordinator 304. Such a re-transmission may occur automatically after a predetermined period of time, such as where a participant or transaction driver has transmitted a report but has not received a response after a certain time (e.g., a timeout period). As a result, transaction coordinator 304 may automatically heal pending transaction table 310 and reconstruct information for complex distributed transactions that may have been lost due to a crash or the like.

In another other example embodiment, a participant may be configured to commit a transaction to its local transaction log in order to abort a particular distributed transaction. For instance, a participant (e.g., one of databases 410, 420, or 430) may store, as pending transaction 414, 424, or 434, an indication that a particular distributed transaction is committed, while also transmitting a participant report to distributed transaction interface 302 that the transaction should be aborted. As a result, while the particular participant may be configured to validate or confirm its portion of the distributed transaction locally, control database 402 will receive a report indicating that the transaction should be aborted, causing the global transaction to be aborted in its entirety (and one or more transaction outcomes consistent with such a determination being transmitted as described herein). In some instances, this participant that commits its portion of the distributed transaction may also be configured to store additional information in transaction log 412, 422, or 432 as an indicator, a flag, or the like indicating that the transaction is intended to be aborted and/or that a participant report was transmitted to the transaction coordinator that contained an abort status for the transaction. In some other instances, the database participant may generate an additional entry in its transaction log, such as a separate local transaction that is not part of the global transaction or an entry that is otherwise linked to the global transaction in the log (e.g., as a pair of transactions or entries, where one entry is part of the global transaction and another transaction is a local transaction that is not part of the global transaction).

In this manner, the information associated with the global transaction that indicates that the transaction should be aborted may be hardened in the local transaction log and therefore remains durable in the event the participant undergoes a recovery following a crash, reboot, etc. As a result, following a recovery, the participant may re-transmit the same participant report to the transaction coordinator that indicates that the transaction should be aborted, thereby aborting the distributed transaction for all involved participants. In this way, the transaction coordinator may reach a consistent outcome (e.g., an abort outcome) for a particular transaction even where a participant database has rebooted or crashed.

Figure 5:
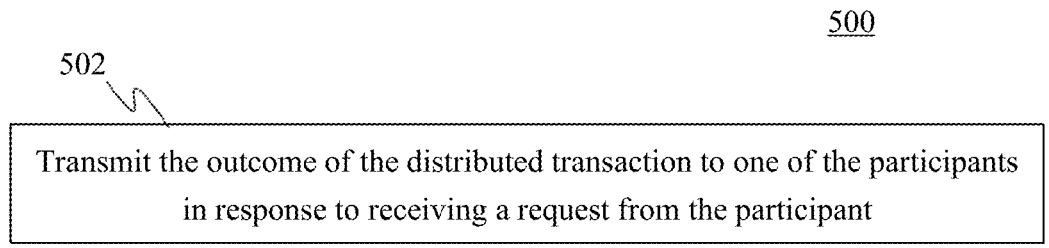
FIG. 5 shows a flowchart of a method for handling a request for the outcome of a distributed transaction to a participant, according to an example embodiment.

As described above, an outcome of the transaction may be transmitted to one or more entities involved in a distributed transaction. For example, FIG. 5 shows a flowchart 500 of a method for handling a request for the outcome of a distributed transaction to a participant, according to an example embodiment. In an implementation, the method of flowchart 500 may be implemented by transaction coordinator 304. FIG. 5 is described with continued reference to FIGS. 3 and 4A-4B. Other structural and operational implementations will be apparent to persons skilled in the relevant art(s) based on the following discussion regarding flowchart 500 and system 300 of FIG. 3 and system 400 of FIGS. 4A-4B.

Flowchart 500 begins with step 502. In step 502, the outcome of a distributed transaction is transmitted to one of the participants of a transaction in response to receiving a request from the participant. For instance, with reference to FIGS. 3 and 4A-4B, outcome determiner 308 may determine that a particular distributed transaction comprising a global identifier and involving a plurality of database participants has reached a final outcome (e.g., committed or aborted). Transaction coordinator 304 may transmit the outcome to any of the database participants involved in the transaction in response to receiving a request from the participant. In one example, the participant report transmitted by the participant to control database 104 may itself be, or alternatively include, the request for an outcome of the transaction. The request may also be transmitted by any one of the participants to control database 104 as a standalone request apart from a participant report. For instance, a participant may transmit such a request after a predetermined time period has passed following transmission of a participant report. As an example, a participant may transmit its participant report as described herein to confirm a distributed transaction and automatically transmit a request to control database 104 after a timeout period requesting a final status of the transaction. In some other examples, a participant may continuously transmit requests at predetermined time intervals requesting the outcome of a distributed transaction from control database 104.

In some other examples, such as where a database participant has crashed, the participant may search through its transaction log to identify each distributed transaction that is in a pending state (i.e., distributed transactions in the log for which an associated transaction outcome is not serialized to the log). For each such transaction, the participant may transmit a request (or re-transmit a participant report including the request) for the final outcome of the transaction. As discussed earlier, since the local transaction log of each participant comprises the appropriate information included in a previously transmitted participant report (the global identifier, participant identifier, descendant participant identifiers, and the status of the portion of the transaction), re-transmission of the participant report following a crash or other event may be carried out with reduced effort, In response, control database 104 may determine whether the transaction has reached a final state based on information contained within durable transaction table 312 or pending transaction table 310, and return the outcome of the transaction to the requesting participant. In some other scenarios, such as where control database 104 itself has crashed resulting in a loss of information in pending transaction table 310, the request (which may comprise the participant report of the participant) may automatically trigger the reconstruction of the transaction in pending transaction table 310, as described above.

It is noted that transaction coordinator 304 is not limited to transmitting the final outcome of a transaction to a participant. Rather, transaction coordinator 304 may configured to transmit a current status (e.g., an "in progress" status, a completion percentage, etc.) of the distributed transaction based on information contained within pending transaction table 310. In another implementation, transaction coordinator 304 may be configured to identify one or more participants for which control database 104 is still awaiting a participant report. In yet other implementations, transaction coordinator 304 may also be configured to transmit an outcome or a status of a particular transaction to transaction driver 114 in response to a request made by the driver.

Figure 6:
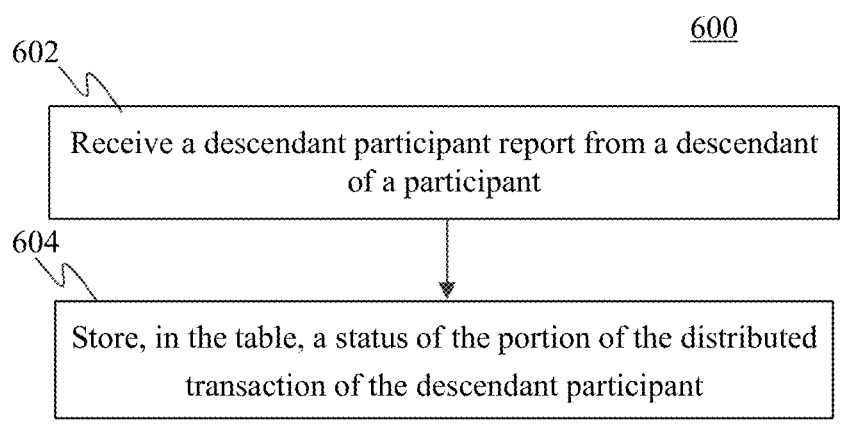
FIG. 6 shows a flowchart of a method for handling a descendant participant report received from a descendant participant, according to an example embodiment.

In implementations, a transaction coordinator may receive reports from a variety of entities involved in a distributed transaction, including a driver report, participant reports, and descendant participant reports. For example, FIG. 6 shows a flowchart 600 of a method for handling a descendant participant report received from a descendant participant, according to an example embodiment. In an implementation, the method of flowchart 600 may be implemented by transaction coordinator 304. FIG. 6 is described with continued reference to FIGS. 3 and 4A-4B Other structural and operational implementations will be apparent to persons skilled in the relevant art(s) based on the following discussion regarding flowchart 500 and system 300 of FIG. 3 and system 400 of FIGS. 4A-4B.

Flowchart 600 begins with step 602. In step 602, a descendant participant report is received from at least one descendant of a participant of a distributed transaction. For example, with reference to FIG. 3, distributed transaction interface 302 may be configured to receive a descendant participant report from at least one descendant of a database participant. In examples, a descendant participant may include any participant that was identified or added to a particular distributed transaction by another database participant. For instance, with reference to FIG. 4A, where database 410 (with participant identifier P1 in the above example) added database 430 (with participant identifier P3) to the distributed transaction, database 430 may be a descendant participant of database 410. In such an example, upon carrying out its respective portion of the distributed transaction identified by database 410, database 430 (P3) may be configured to store the pending transaction in transaction log 432 as pending transaction 434. Database 430 may also be configured to transmit a descendant participant report to distributed transaction interface 302 that includes a format similar to, or the same as, participant reports transmitted by database 420 and/or database 420. For example, the descendant participant report of database 430 may include the global identifier (D1) of the distributed transaction, the descendant participant identifier (P3), an identification or listing of any additional descendant participant identifiers (none in this example), and a status of the portion of the distributed transaction of the descendant participant (committed or aborted).

In step 602, a status of the portion of the distributed transaction of the descendant participant is stored in a table. For instance, with reference to FIGS. 4A-4B, transaction coordinator 304 may cause pending transaction table 310 to store a status of the portion of the transaction. In one example, the status may indicate whether the descendant participant is in an "added by a descendant" state, such as where the descendant participant identifier is not already in pending transaction table 310. In another example, if pending transaction table 310 already comprises the descendant participant identifier (P3) along with an "added by a parent" status, pending transaction table 310 may be updated to change the status to a "both confirmed" status upon receiving the descendant participant report. In other examples, the status may include an indication or flag identifying whether the descendant participant has committed to or aborted the distributed transaction.

It is understood, however, that upon receiving the descendant participant report, distributed transaction interface 302 may cause transaction coordinator 304 to take any other action described herein, including but not limited to returning a final outcome or status of the distributed transaction to the descendant participant, updating pending transaction table 310 based on information in the descendant participant report (e.g., identifying new descendants), and/or initiate construction of the transaction in pending transaction table 310 if it is not already present (e.g., where the descendant participant is the first entity to transmit a report corresponding to the global identifier).

III. Example Mobile and Stationary Device Embodiments

Server 102, servers 103A-103N, computing device 112, control database 104, transaction coordination system 106, databases 108A-108N, transaction driver 114, distributed transaction interface 302, transaction coordinator 304, durable transaction table 312, control database 402, database 410, database 420, database 430, flowchart 200, flowchart 500, and/or flowchart 600 may be implemented in hardware, or hardware combined with software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For example, one or more of server 102, servers 103A-103N, computing device 112, control database 104, transaction coordination system 106, databases 108A-108N, transaction driver 114, distributed transaction interface 302, transaction coordinator 304, durable transaction table 312, control database 402, database 410, database 420, database 430, flowchart 200, flowchart 500, and/or flowchart 600 may be implemented separately or together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
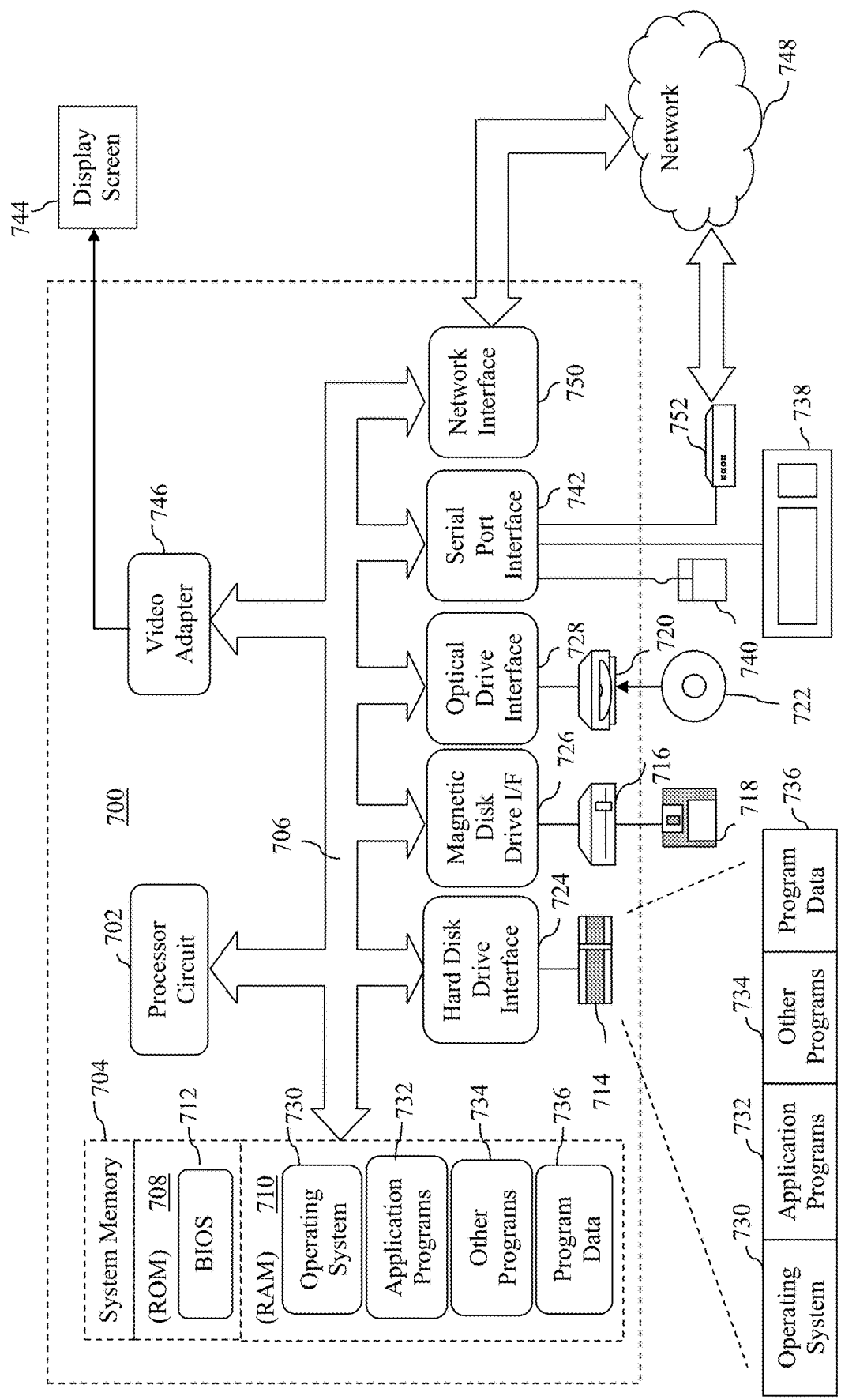
FIG. 7 shows a block diagram of an example computing device that may be used to implement example embodiments.

FIG. 7 depicts an exemplary implementation of a computing device 700 in which embodiments may be implemented. For example, any of server 102, servers 103A-103N, computing device 112, control database 104, transaction coordination system 106, databases 108A-108N, transaction driver 114, distributed transaction interface 302, transaction coordinator 304, durable transaction table 312, control database 402, database 410, database 420, or database 430 may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing server 102, servers 103A-103N, computing device 112, control database 104, transaction coordination system 106, databases 108A-108N, transaction driver 114, distributed transaction interface 302, transaction coordinator 304, durable transaction table 312, control database 402, database 410, database 420, database 430, flowchart 200, flowchart 500, and/or flowchart 600 (including any suitable step of flowcharts 200, 500, or 600) and/or further embodiments described herein.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments described herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A system for coordinating a distributed transaction is disclosed herein. The system includes: at least one processor; and a memory that stores program code configured to be executed by the at least one processor, the program code comprising: a distributed transaction interface configured to: receive, from a transaction driver, a driver report comprising a global identifier of the distributed transaction, a transaction driver identifier, and a plurality of participant identifiers, each participant identifier identifying a participant responsible for a portion of the distributed transaction that is a descendant of the transaction driver; determine whether a participant report is received from each of the plurality of participants, each participant report comprising the global identifier, the participant identifier of the participant, an identification of any descendant participant identifiers identifying descendants of the participant, and a status of the portion of the distributed transaction of the participant; a transaction coordinator configured to: store, in a table, the global identifier, the plurality of participant identifiers, any descendant participant identifiers of each participant, and for each of the participants that transmitted a participant report, a status of the portion of the distributed transaction of the participant; determine an outcome of the distributed transaction using the table; and transmit the outcome to at least one of the participants.

In one implementation of the foregoing system, the table is a lock-free hash map that includes an indication of whether each participant or descendant participant was added by a parent or a descendant entity.

In another implementation of the foregoing system, the transaction coordinator is configured to transmit the outcome to the one of the participants in response to receiving a request from the participant.

In another implementation of the foregoing system, the global identifier is a unique identifier of the distributed transaction generated by the transaction driver.

In another implementation of the foregoing system, the distributed transaction interface is configured to receive a descendant participant report from at least one descendant of a participant, the descendant participant report comprising the global identifier, a descendant participant identifier of the descendant participant, an identification of any additional descendant participant identifiers, and a status of a portion of the distributed transaction of the descendant participant.

In another implementation of the foregoing system, the outcome of the distributed transaction is determined to be an aborted transaction by the transaction coordinator based on at least one of: a failure to receive a participant report from at least one of the participants or descendant participants after a predetermined period of time, or receipt of a participant report from one of the participants or descendant participants indicating that the portion of the distributed transaction of the participant or descendant participant has been aborted.

In another implementation of the foregoing system, the outcome of the distributed transaction is a committed transaction; and the transaction coordinator is configured to store the outcome in a durable table.

A method for coordinating a distributed transaction is disclosed herein. The method includes: receiving, from a transaction driver, a driver report comprising a global identifier of the distributed transaction, a transaction driver identifier, and a plurality of participant identifiers, each participant identifier identifying a participant responsible for a portion of the distributed transaction that is a descendant of the transaction driver; determining whether a participant report is received from each of the plurality of participants, each participant report comprising the global identifier, the participant identifier of the participant, an identification of any descendant participant identifiers identifying descendants of the participant, and a status of the portion of the distributed transaction of the participant; storing, in a table, the global identifier, the plurality of participant identifiers, any descendant participant identifiers of each participant, and for each of the participants that transmitted a participant report, a status of the portion of the distributed transaction of the participant; determining an outcome of the distributed transaction using the table; and transmitting the outcome to at least one of the participants.

In one implementation of the foregoing method, the table is a lock-free hash map that includes an indication of whether each participant or descendant participant was added by a parent or a descendant entity.

In another implementation of the foregoing method, the transmitting comprises transmitting the outcome to one of the participants in response to receiving a request from the participant.

In another implementation of the foregoing method, the global identifier is a unique identifier of the distributed transaction generated by the transaction driver.

In another implementation of the foregoing method, the method further includes: receiving a descendant participant report from at least one descendant of a participant, the descendant participant report comprising the global identifier, a descendant participant identifier of the descendant participant, an identification of any additional descendant participant identifiers, and a status of a portion of the distributed transaction of the descendant participant.

In another implementation of the foregoing method, the determining the outcome of the distributed transaction using the table comprises: determining the outcome of the distributed transaction to be an aborted transaction based on at least one of: a failure to receive a participant report from at least one of the participants or descendant participants after a predetermined period of time, or a receipt of a participant report from one of the participants or descendant participants indicating that the portion of the distributed transaction of the participant or descendant participant has been aborted.

In another implementation of the foregoing method, the determining the outcome of the distributed transaction using the table comprises: determining the outcome of the distributed transaction to be a committed transaction; and the storing comprises: storing the outcome in a durable table.

A computer-readable memory is disclosed herein. The computer-readable memory includes computer program code recorded thereon that when executed by at least one processor causes the at least one processor to perform a method comprising: receiving, from a transaction driver, a driver report comprising a global identifier of the distributed transaction, a transaction driver identifier, and a plurality of participant identifiers, each participant identifier identifying a participant responsible for a portion of the distributed transaction that is a descendant of the transaction driver; determining whether a participant report is received from each of the plurality of participants, each participant report comprising the global identifier, the participant identifier of the participant, an identification of any descendant participant identifiers identifying descendants of the participant, and a status of the portion of the distributed transaction of the participant; storing, in a table, the global identifier, the plurality of participant identifiers, any descendant participant identifiers of each participant, and for each of the participants that transmitted a participant report, a status of the portion of the distributed transaction of the participant; determining an outcome of the distributed transaction using the table; and transmitting the outcome to at least one of the participants.

In one implementation of the foregoing computer-readable memory, the table is a lock-free hash map that includes an indication of whether each participant or descendant participant was added by a parent or a descendant entity.

In another implementation of the foregoing computer-readable memory, the transmitting comprises: transmitting the outcome to one of the participants in response to receiving a request from the participant.

In another implementation of the foregoing computer-readable memory, the method further includes: receiving a descendant participant report from at least one descendant of a participant, the descendant participant report comprising the global identifier, a descendant participant identifier of the descendant participant, an identification of any additional descendant participant identifiers, and a status of a portion of the distributed transaction of the descendant participant.

In another implementation of the foregoing computer-readable memory, the determining an outcome of the distributed transaction using the table comprises: determining the outcome of the distributed transaction to be an aborted transaction based on at least one of: a failure to receive a participant report from at least one of the participants or descendant participants after a predetermined period of time, or a receipt of a participant report from one of the participants or descendant participants indicating that the portion of the distributed transaction of the participant or descendant participant has been aborted.

In another implementation of the foregoing computer-readable memory, the determining an outcome of the distributed transaction using the table comprises: determining the outcome of the distributed transaction to be a committed transaction; and the storing comprises: storing the outcome in a durable table.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system for coordinating a distributed transaction, the system comprising:
at least one processor; and
a memory that stores program code configured to be executed by the at least one processor, the program code comprising:
a transaction coordination system configured to:
receive, from a first participant of a distributed transaction, a first participant report comprising a global identifier of the distributed transaction, a first participant identifier of the first participant, and a status of the portion of the distributed transaction of the first participant;
initiate the generation of a table representing a hierarchy of the distributed transaction corresponding to the global identifier, the table indicating the first participant identifier, the status of the portion of the distributed transaction of the first participant, and an indication that the first participant is identified as a participant to the distributed transaction by a parent entity;
receive, from a transaction driver that initiated the distributed transaction, a driver report comprising the global identifier, a transaction driver identifier, and the first participant identifier, wherein the driver report is received after the first participant report is received;

in response to receiving the driver report, update the table for the distributed transaction corresponding to the global identifier to:
  identify the transaction driver identifier, and
  change the indication that the first participant is identified as a participant to the distributed transaction by a parent entity to an indication that the first participant is in a confirmed state;
determine an outcome of the distributed transaction using the table; and
transmit the outcome to the first participant.

2. The system of claim 1, wherein the table is a lock-free hash map.

3. The system of claim 1, wherein the transaction coordinator is configured to transmit the outcome to the first participant in response to receiving a request from the first participant.

4. The system of claim 1, wherein the global identifier is a unique identifier of the distributed transaction generated by the transaction driver.

5. The system of claim 1, wherein the transaction coordination system is configured to receive a descendant participant report from at least one descendant of the first participant, the descendant participant report comprising the global identifier, a descendant participant identifier of the descendant participant, an identification of any additional descendant participant identifiers, and a status of a portion of the distributed transaction of the descendant participant.

6. The system of claim 1, wherein the outcome of the distributed transaction is determined to be an aborted transaction by the transaction coordination system based on at least one of:
  a failure to receive a participant report from a participant to the distributed transaction after a predetermined period of time, or
  receipt of a participant report from any participant to the distributed transaction indicating that a portion of the distributed transaction has been aborted.

7. The system of claim 1, wherein the outcome of the distributed transaction is a committed transaction; and
  wherein the transaction coordination system is configured to store the outcome in a durable table.

8. A method for coordinating a distributed transaction, the method comprising:
  receiving, from a first participant of a distributed transaction, a first participant report comprising a global identifier of the distributed transaction, a first participant identifier of the first participant, and a status of the portion of the distributed transaction of the first participant;
  initiating the generation of a table representing a hierarchy of the distributed transaction corresponding to the global identifier, the table indicating the first participant identifier, the status of the portion of the distributed transaction of the first participant, and an indication that the first participant is identified as a participant to the distributed transaction by a parent entity;
  receiving, from a transaction driver that initiated the distributed transaction, a driver report comprising the global identifier, a transaction driver identifier, and the first participant identifier, wherein the driver report is received after the first participant report is received;
  in response to receiving the driver report, updating the table for the distributed transaction corresponding to the global identifier to:
    identify the transaction driver identifier, and
    change the indication that the first participant is identified as a participant to the distributed transaction by a parent entity to an indication that the first participant is in a confirmed state;
  determining an outcome of the distributed transaction using the table; and
  transmitting the outcome to the first participant.

9. The method of claim 8, wherein the table is a lock-free hash map.

10. The method of claim 8, wherein said transmitting comprises:
  transmitting the outcome to the first participant in response to receiving a request from the first participant.

11. The method of claim 8, wherein the global identifier is a unique identifier of the distributed transaction generated by the transaction driver.

12. The method of claim 8, further comprising:
  receiving a descendant participant report from at least one descendant of the first participant, the descendant participant report comprising the global identifier, a descendant participant identifier of the descendant participant, an identification of any additional descendant participant identifiers, and a status of a portion of the distributed transaction of the descendant participant.

13. The method of claim 8, wherein said determining the outcome of the distributed transaction using the table comprises:
  determining the outcome of the distributed transaction to be an aborted transaction based on at least one of:
    a failure to receive a participant report from a participant to the distributed transaction after a predetermined period of time, or
    a receipt of a participant report from any participant to the distributed transaction indicating that a portion of the distributed transaction has been aborted.

14. The method of claim 8, wherein said determining the outcome of the distributed transaction using the table comprises:
  determining the outcome of the distributed transaction to be a committed transaction; and
  storing the outcome in a durable table.

15. A computer-readable memory having computer program code recorded thereon that when executed by at least one processor causes the at least one processor to perform a method comprising:
  receiving, from a first participant of a distributed transaction, a first participant report comprising a global identifier of the distributed transaction, a first participant identifier of the first participant, and a status of the portion of the distributed transaction of the first participant;
  initiating the generation of a table representing a hierarchy of the distributed transaction corresponding to the global identifier, the table indicating the first participant identifier, the status of the portion of the distributed transaction of the first participant, and an indication that the first participant is identified as a participant to the distributed transaction by a parent entity;
  receiving, from a transaction driver that initiated the distributed transaction, a driver report comprising the global identifier, a transaction driver identifier, and the first participant identifier, wherein the driver report is received after the first participant report is received;
  in response to receiving the driver report, updating the table for the distributed transaction corresponding to the global identifier to:

identify the transaction driver identifier, and
change the indication that the first participant is identified as a participant to the distributed transaction by a parent entity to an indication that the first participant is in a confirmed state;
determining an outcome of the distributed transaction using the table; and
transmitting the outcome to the first participant.

16. The computer-readable memory of claim 15, wherein the table is a lock-free hash map.

17. The computer-readable memory of claim 15, wherein said transmitting comprises:
transmitting the outcome to the first participant in response to receiving a request from the first participant.

18. The computer-readable memory of claim 15, further comprising:
receiving a descendant participant report from at least one descendant of the first participant, the descendant participant report comprising the global identifier, a descendant participant identifier of the descendant participant, an identification of any additional descendant participant identifiers, and a status of a portion of the distributed transaction of the descendant participant.

19. The computer-readable memory of claim 15, wherein said determining the outcome of the distributed transaction using the table comprises:
determining the outcome of the distributed transaction to be an aborted transaction based on at least one of:
a failure to receive a participant report from a participant to the distributed transaction after a predetermined period of time, or
a receipt of a participant report from any participant to the distributed transaction indicating that a portion of the distributed transaction has been aborted.

20. The computer-readable memory of claim 15, wherein said determining the outcome of the distributed transaction using the table comprises:
determining the outcome of the distributed transaction to be a committed transaction; and
storing the outcome in a durable table.

* * * * *